(12) United States Patent
Cho et al.

(10) Patent No.: US 8,836,903 B2
(45) Date of Patent: Sep. 16, 2014

(54) LIQUID CRYSTAL DISPLAY

(75) Inventors: Se-Hyoung Cho, Seoul (KR);
Dong-Gyu Kim, Yongin-si (KR);
Mee-Hye Jung, Suwon-si (KR);
Dong-Hyeon Ki, Cheonan-si (KR);
Seung-Soo Baek, Suwon-si (KR);
Hye-Seok Na, Suwon-si (KR)

(73) Assignee: Samsung Display Co., Ltd., Yongin (KR)

( * ) Notice: Subject to any disclaimer, the term of this patent is extended or adjusted under 35 U.S.C. 154(b) by 1001 days.

(21) Appl. No.: 12/900,436

(22) Filed: Oct. 7, 2010

(65) Prior Publication Data
US 2011/0221988 A1      Sep. 15, 2011

(30) Foreign Application Priority Data

Mar. 10, 2010    (KR) .................. 10-2010-0021242

(51) Int. Cl.
*G02F 1/1343*       (2006.01)
*G02F 1/139*        (2006.01)
*G09G 3/36*         (2006.01)
*G02F 1/1362*       (2006.01)

(52) U.S. Cl.
CPC ...... *G02F 1/1395* (2013.01); *G09G 2300/0447* (2013.01); *G02F 1/134363* (2013.01); *G09G 2300/043* (2013.01); *G09G 2300/0443* (2013.01); *G09G 2300/0426* (2013.01); *G02F 1/136213* (2013.01); *G09G 3/3648* (2013.01)
USPC ...................................................... 349/144

(58) Field of Classification Search
CPC ......................................... G02F 2001/134345
USPC ......................................................... 349/144
See application file for complete search history.

(56) References Cited

U.S. PATENT DOCUMENTS

| | | | |
|---|---|---|---|
| 2007/0008263 A1* | 1/2007 | Kim ............................... | 345/87 |
| 2008/0246720 A1 | 10/2008 | Lee et al. | |

FOREIGN PATENT DOCUMENTS

| | | |
|---|---|---|
| JP | 2001-033809 | 2/2001 |
| JP | 2008-286933 | 11/2008 |
| JP | 2009-020514 | 1/2009 |
| JP | 2009-092912 | 4/2009 |
| JP | 2009-145593 | 7/2009 |
| KR | 1020050108120 | 11/2005 |
| KR | 1020070084902 | 8/2007 |
| KR | 1020090015737 | 2/2009 |
| KR | 1020090020405 | 2/2009 |

* cited by examiner

*Primary Examiner* — James Dudek
(74) *Attorney, Agent, or Firm* — H.C. Park & Associates, PLC

(57) ABSTRACT

A liquid crystal display includes first and second substrates, and a liquid crystal layer disposed therebetween. First and second gate lines are disposed on the first substrate. First and second data lines, and a power line are disposed on the first substrate. A first switching element is connected to the first gate line and the first data line, a second switching element is connected to the first gate line and the power line, a third switching element is connected to the second gate line and the second data line, a first pixel electrode is connected to the first switching element, a second pixel electrode is connected to the second switching element, a third pixel electrode is connected to the second switching element, and a fourth pixel electrode is connected to the third switching element, and a gate-on voltage can be simultaneously applied to the first and second gate lines.

51 Claims, 11 Drawing Sheets

LIQUID CRYSTAL DISPLAY

CROSS REFERENCE TO RELATED APPLICATION

This application claims priority from and the benefit of Korean Patent Application No. 10-2010-0021242 filed on Mar. 10, 2010, which is hereby incorporated by reference for all purposes as if fully set forth herein.

BACKGROUND OF THE INVENTION

1. Field of the Invention

Exemplary embodiments of the present invention relate to a liquid crystal display.

2. Discussion of the Background

A liquid crystal display is currently one of the most widely used flat panel displays. The liquid crystal display includes two display panels on which field generating electrodes such as a pixel electrode and a common electrode are formed and a liquid crystal layer that is disposed therebetween. An image is shown on the liquid crystal display by applying voltage to a field generating electrode to generate an electric field in a liquid crystal layer, which determines alignment of liquid crystal molecules of the liquid crystal layer and controls polarization of incident light.

The liquid crystal display includes a switching element that is connected to each pixel electrode, and a plurality of signal lines such as a gate line and a data line for applying voltage to a pixel electrode by controlling the switching element.

The liquid crystal display receives an input image signal from an external graphic controller. The input image signal includes luminance information of each pixel, and each luminance has a predetermined value. Each pixel receives a data voltage that corresponds to desired luminance information. The data voltage that is applied to the pixel is represented by the pixel voltage according to a difference in relative voltage, and each pixel shows luminance illustrating a gray level of an image signal according to the pixel voltage. At this time, the pixel voltage range that can be used by the liquid crystal display is determined according to a driving unit.

Meanwhile, in order to apply a data voltage to each pixel electrode of the liquid crystal display, each pixel electrode is connected to a switching element, and since light does not penetrate through a position at which the switching element is formed, as the number of switching elements is increased, the aperture ratio of the liquid crystal display decreases. In addition, in order to connect various signal transfer lines that are formed on different layers to transfer signals to each pixel, a contact hole is formed, and light does not penetrate through a region in which the contact hole is formed, such that the aperture ratio of the liquid crystal display is lowered.

Meanwhile, as the length of the signal line for transferring the signal to each pixel electrode of the liquid crystal display is increased, resistance increases, such that a signal delay occurs, thereby lowering a display quality.

Meanwhile, the driving unit of the liquid crystal display is attached to the display panel by directly mounting it in a form of a plurality of integrated circuit (IC) chips on the display panel or mounting it on a flexible circuit layer, and the IC chip accounts for a high percentage of the manufacturing cost when manufacturing the liquid crystal display. Particularly, as the number of data lines to which data voltage is applied increases, the cost of the driving unit of the liquid crystal display increases.

In addition, in order to increase a display quality of the liquid crystal display, it is necessary to implement a liquid crystal display that has a high contrast ratio, an excellent light viewing angle, and a rapid response speed.

The above information disclosed in this Background section is only for enhancement of understanding of the background of the invention and therefore it may contain information that is not prior art.

SUMMARY OF THE INVENTION

Exemplary embodiments of the present invention provide a liquid crystal display that can simultaneously ensure a high contrast ratio and light viewing angle of the liquid crystal display, increase a response speed of a liquid crystal molecule, increase an aperture ratio of the liquid crystal display, prevent a signal delay, lower the number of data lines, and lower a cost of a driving unit of the liquid crystal display.

Exemplary embodiments of the present invention also provide a method for driving a liquid crystal display that can simultaneously ensure a high contrast ratio and light viewing angle of the liquid crystal display, increase a response speed of a liquid crystal molecule, increase an aperture ratio of the liquid crystal display, prevent a signal delay, lower the number of data lines, and lower a cost of a driving unit of the liquid crystal display.

Additional features of the invention will be set forth in the description which follows, and in part will be apparent from the description, or may be learned by practice of the invention.

An exemplary embodiment of the present invention discloses a liquid crystal display that includes a first substrate and a second substrate that face each other, and a liquid crystal layer that is disposed between the first and the second substrates and includes a liquid crystal molecule. A first gate line and a second gate line are disposed on the first substrate and transfer a gate signal. A first data line and a second data line are disposed on the first substrate, and a first power line is disposed on the first substrate. A first switching element is connected to the first gate line and the first data line, a second switching element is connected to the first gate line and the first power line, a third switching element is connected to the second gate line and the second data line, a first pixel electrode is connected to the first switching element, a second pixel electrode is connected to the second switching element, a third pixel electrode is connected to the second switching element, and a fourth pixel electrode is connected to the third switching element.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DETAILED DESCRIPTION OF THE ILLUSTRATED EMBODIMENTS

Figure 1:
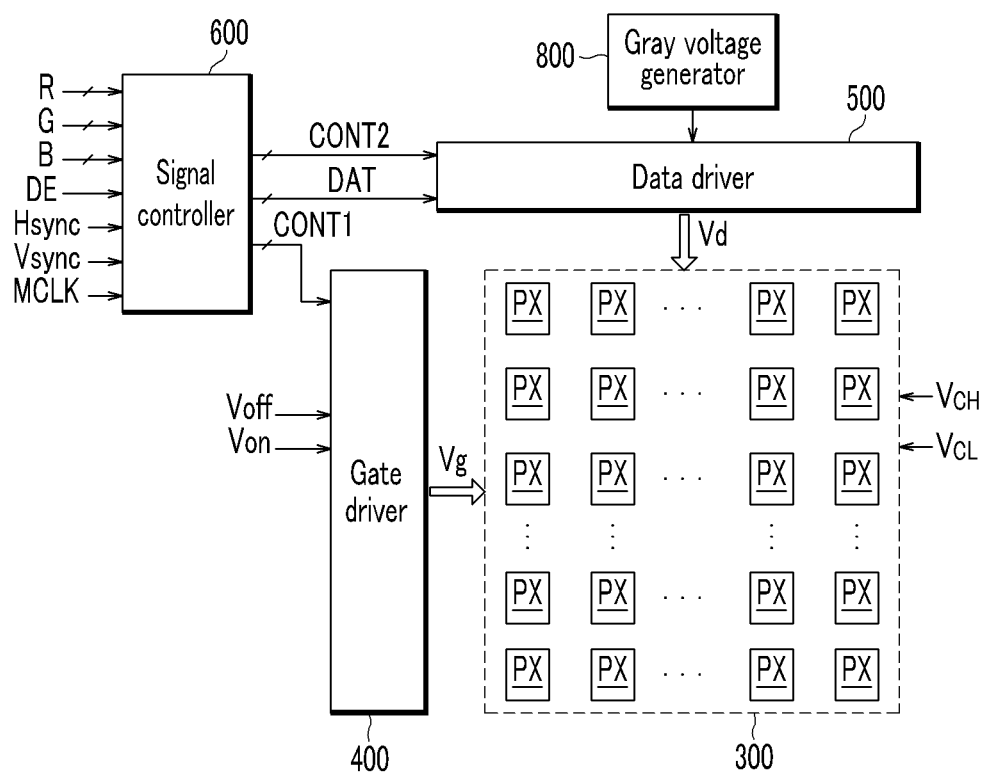
FIG. 1 is a block diagram of a liquid crystal display according to an exemplary embodiment of the present invention.

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention.

In the drawings, the thickness of layers, films, panels, regions, etc., may be exaggerated for clarity. Like reference numerals designate like elements throughout the specification. It will be understood that when an element such as a layer, film, region, or substrate is referred to as being "on" or "connected to" another element, it can be directly on or directly connected to the other element or intervening elements may also be present. In contrast, when an element is referred to as being "directly on" or "directly connected to" another element, there are no intervening elements present.

Hereinafter, a liquid crystal display according to an exemplary embodiment of the present invention will be described in detail with reference to the accompanying drawings.

Figure 2:
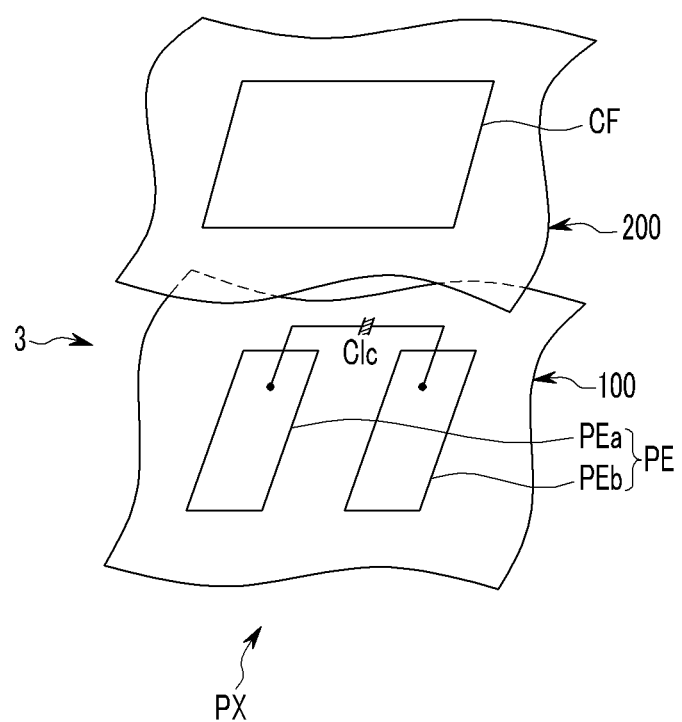
FIG. 2 is an equivalent circuit diagram illustrating a pixel in conjunction with a structure of the liquid crystal display according to an exemplary embodiment of the present invention.

FIG. 1 is a block diagram of a liquid crystal display according to an exemplary embodiment of the present invention, and FIG. 2 is an equivalent circuit diagram illustrating a pixel in conjunction with a structure of the liquid crystal display according to the exemplary embodiment of the present invention.

With reference to FIG. 1, a liquid crystal display according to an exemplary embodiment of the present invention includes a liquid crystal panel assembly 300, a gate driver 400, a data driver 500, a gray voltage generator 800 and a signal controller 600.

With reference to FIG. 2, the liquid crystal panel assembly 300 includes a lower display panel 100 and an upper display panel 200 that face each other and a liquid crystal layer 3 that is disposed between them.

The liquid crystal capacitor Clc uses a first pixel electrode PEa and a second pixel electrode PEb of the lower display panel 100 as two terminals, and the liquid crystal layer 3 that is disposed between the first pixel electrode PEa and the second pixel electrode PEb acts as a dielectric material. The first pixel electrode PEa is connected to the first switching element (not shown), and the second pixel electrode PEb is connected to the second switching element (not shown). The first switching element and the second switching element are each connected to a corresponding gate line (not shown) and data line (not shown).

The liquid crystal layer 3 has a dielectric anisotropy, and the liquid crystal molecules of the liquid crystal layer 3 may be aligned so that long axes thereof are vertical with respect to the facing surfaces of the two display panels in a state in which there is no electric field.

The first pixel electrode PEa and the second pixel electrode PEb may be formed on different layers or the same layer. A first storage capacitor (not shown) and a second storage capacitor (not shown) that act as an auxiliary capacitor of the liquid crystal capacitor Clc may be formed so that a separate electrode (not shown) that is disposed on the lower display panel 100 overlaps between the first and the second pixel electrodes PEa and PEb and the insulator.

Meanwhile, in order to implement a color display, a desired color is recognized by using the spatial and temporal sum of primary colors by intrinsically displaying any one of the primary colors by each pixel PX (spatial division) or alternately displaying the primary colors according to the time by each pixel PX (temporal division). Examples of the primary colors may include three primary colors such as red, green and blue. FIG. 2 is an example of the spatial division, and shows that each pixel PX is provided with a color filter CF showing any one of the primary colors in the region of the upper display panel 200 corresponding to the first and the second pixel electrodes PEa and PEb. Unlike FIG. 2, the color filter CF may be disposed above or beneath the first and the second pixel electrodes PEa and PEb of the lower display panel 100.

At least one polarizer (not shown) is provided in the liquid crystal panel assembly 300.

Figure 3:
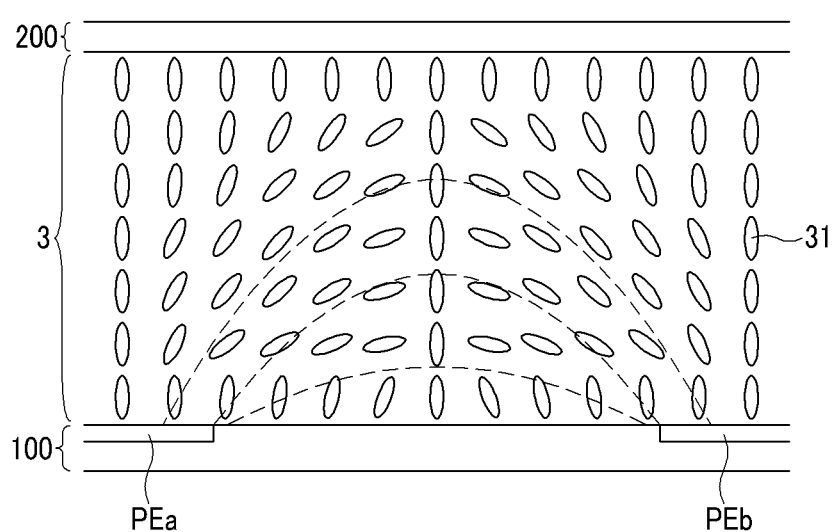
FIG. 3 is a schematic cross-sectional view of a liquid crystal display according to an exemplary embodiment of the present invention.

With reference to FIG. 3 and FIG. 1 and FIG. 2, an operation of the liquid crystal display according to an exemplary embodiment of the present invention will be described.

FIG. 3 is a schematic cross-sectional view of a liquid crystal display according to an exemplary embodiment of the present invention.

With reference to FIG. 2 and FIG. 3, if voltage VCH and VCL is applied to the data line or power line that is connected to each pixel, it is applied to the corresponding pixel PX through the first and the second switching elements that are turned on by the gate signal. That is, the first data voltage or the first voltage is applied through the first switching element to the first pixel electrode PEa, and the second data voltage or the second voltage is applied through the second switching element to the second pixel electrode PEb. At this time, a difference in voltage that is applied to the first pixel electrode PEa and the second pixel electrode PEb is a voltage that corresponds to the luminance that is displayed by the pixel PX, and the polarities of the voltage that is applied to the first pixel electrode PEa and the second pixel electrode PEb may be opposites in respect to the reference voltage Vref.

A difference between two voltages in which the polarities applied to the first pixel electrode PEa and the second pixel electrode PEb are different from each other is displayed as a charge voltage of the liquid crystal capacitor Clc, that is, the pixel voltage. If a potential difference occurs at the liquid crystal capacitor Clc, as shown in FIG. 3, the electric field is parallel to the surfaces of the display panels 100 and 200 in the liquid crystal layer 3 between the first and the second electrodes PEa and PEb. In the case of when the liquid crystal molecules 31 have a positive dielectric anisotropy, the liquid crystal molecules 31 are inclined to be parallel to a direction of the electric field, and the degree of inclination varies according to the size of the pixel voltage. This liquid crystal layer 3 is called an electrically-induced optical compensation (EOC) mode. According to the degree of inclination of the liquid crystal molecules 31, the degree of polarization of light that passes through the liquid crystal layer 3 varies. The variation of the polarization is displayed as a variation in transmittance of light by a polarizer, and a desired predetermined luminance is displayed by the pixel PX.

The driving voltage may be increased, a response speed of the liquid crystal molecules 31 may be increased, and the transmittance of the liquid crystal display may be increased by applying two voltages which have different polarities with respect to the reference voltage Vref to the pixel PX. In addition, since the polarities of two voltages that are applied to one pixel PX are opposites, in the case of when an inversion type in the data driver 500 is a column inversion or row inversion, like a dot inversion driving, image degradation by a flicker can be prevented.

In addition, when the first and the second switching elements are turned off in one pixel PX, since the voltages that are applied to the first and the second pixel electrodes PEa and PEb decrease by a kickback voltage, there is little variation in charge voltage of the pixel PX. Thus, the display characteristics of the liquid crystal display can be improved.

Figure 4:
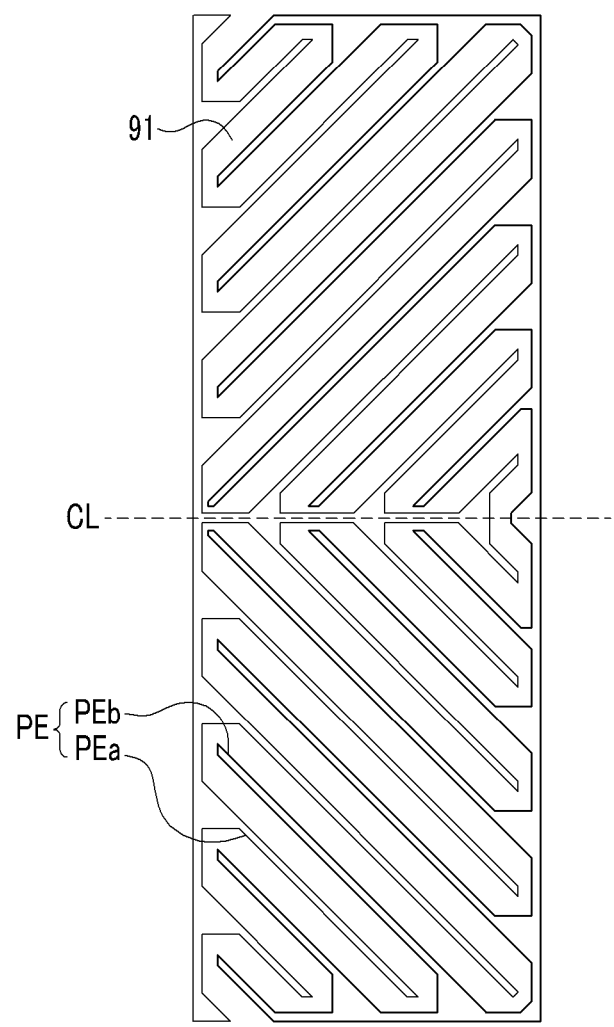
FIG. 4 is a layout view illustrating a shape of the pixel of a liquid crystal display according to an exemplary embodiment of the present invention.

Now, with reference to FIG. 4, the shapes of the first and the second pixel electrodes PEa and PEb of one pixel PX of the liquid crystal panel assembly 300 according to an exemplary embodiment of the present invention will be described. FIG. 4 is a layout view illustrating a shape of the pixel PX of a liquid crystal display according to an exemplary embodiment of the present invention.

With reference to FIG. 4, an entire external appearance of one pixel electrode PE is a quadrangle, and the first and the second pixel electrodes PEa and PEb are engaged while a gap 91 is disposed therebetween. The first and the second pixel electrodes PEa and PEb are vertically symmetrical with an interface of the virtual central line CL, and divided into upper and lower regions.

The first pixel electrode PEa includes a protruding portion at a lower part thereof, a vertical stem portion at a left part thereof, a transverse stem portion that extends from the central portion of the vertical stem portion rightward, and a plurality of branched portions. The branched portion that is over the transverse central line CL inclinedly extends from the vertical stem portion or transverse stem portion in a right and upward direction, and the branched portion that is disposed at a lower part thereof inclinedly extends from the vertical stem portion or transverse stem portion in a right and downward direction. An angle that is formed by the branched portions and the transverse central line CL may be about 45°.

The second pixel electrode PEb includes a protruding portion at a lower part thereof, a vertical stem portion at a right part thereof, a transverse stem portion at an upper and lower part thereof and a plurality of branched portions. The transverse stem portions at the upper and lower parts thereof extend from the upper and lower parts of the vertical stem portion to the left in a transverse direction. The branched portion that is disposed at the upper part thereof on the basis of the transverse central line CL inclinedly extends from the vertical stem portion or upper transverse stem portion in a left and downward direction, and the branched portion that is disposed at a lower part thereof inclinedly extends from the vertical stem portion or lower transverse stem portion in a left and upward direction. An angle that is formed by the branched portions of the second pixel electrode PEb and the transverse central line CL may be about 45°. The branched portions at the upper and lower parts thereof may be in a right angle while the transverse central line CL is disposed as the centre thereof.

The branched portions of the first and the second pixel electrodes PEa and PEb are engaged at a predetermined interval and alternately disposed to form a pattern of teeth of a comb.

However, the shapes of the first and the second pixel electrodes PEa and PEb of one pixel PX of the liquid crystal panel assembly according to an exemplary embodiment of the present invention are not limited thereto, and the pixel electrode PE may include all shapes in which at least portions of the first pixel electrode PEa and the second pixel electrode PEb are formed on the same layer and alternately disposed.

Figure 5:
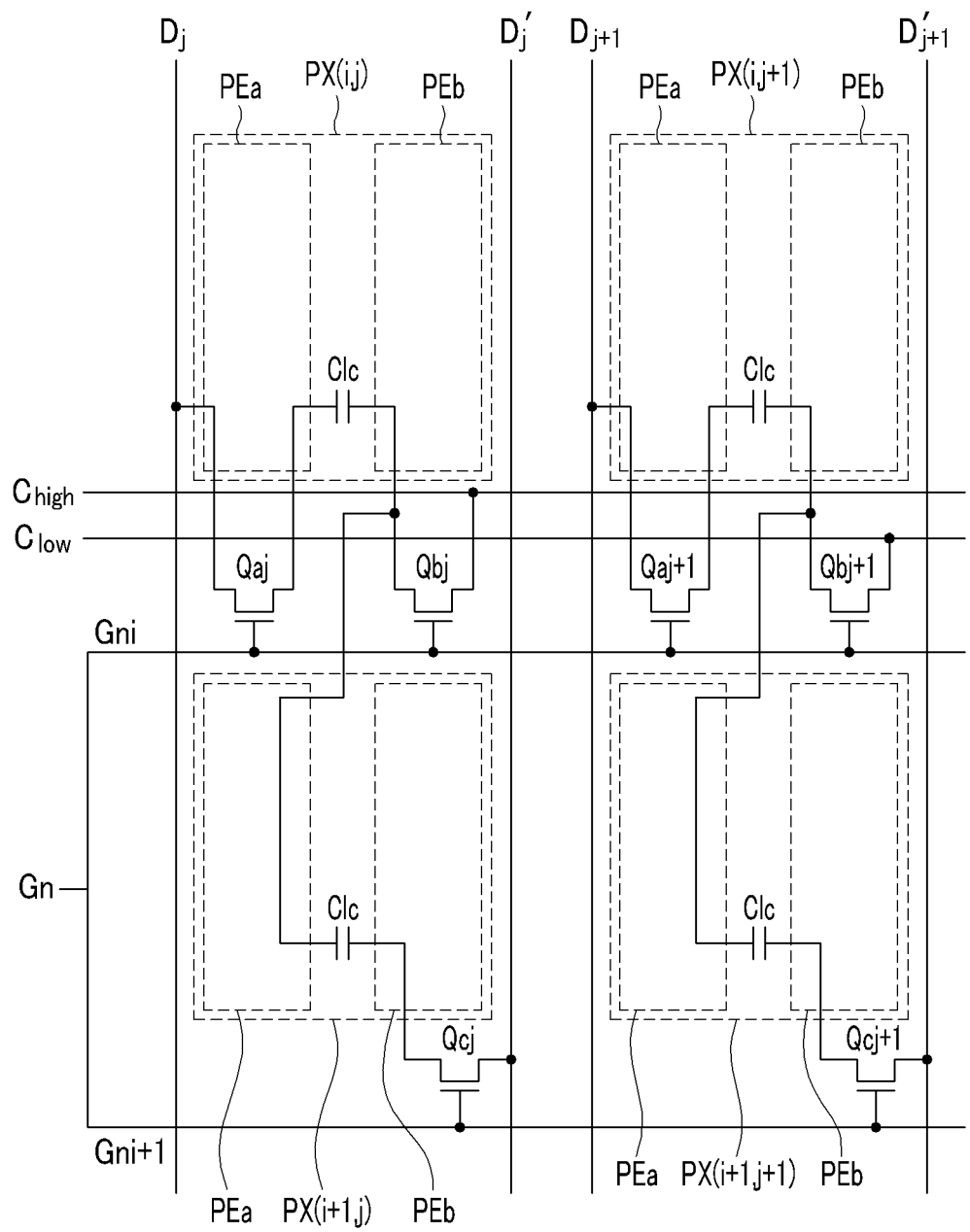
FIG. 5 is an equivalent circuit diagram illustrating four pixels of the liquid crystal display according to an exemplary embodiment of the present invention.

With reference to FIG. 2 and FIG. 5, arrangement of the signal line and pixel of the liquid crystal display according to an exemplary embodiment of the present invention and a driving method thereof will be described. FIG. 5 is an equivalent circuit diagram illustrating four pixels of the liquid crystal display according to the exemplary embodiment of the present invention.

With reference to FIG. 2 and FIG. 5, the liquid crystal display according to the present exemplary embodiment includes a plurality of the first pixels PX(i, j) and a plurality of the second pixels PX(i+1, j) that are adjacent in a pixel column direction, a plurality of the third pixels PX(i, j+1) and a plurality of the fourth pixels PX(i+1, j+1) that are adjacent to a plurality of the first pixels PX(i, j) and a plurality of the second pixels PX(i+1, j) respectively in a pixel row direction, and a plurality of signal lines (Gni, Gni+1, Dj, Dj', Dj+1, Dj+1', Chigh, Clow) that are connected thereto. The signal lines (Gni, Gni+1, Dj, Dj', Dj+1, Dj+1', Chigh, Clow) include a gate line Gn that transfers a gate signal (it may be called a "scanning signal"), data lines (Dj and Dj', Dj+1 and Dj+1') that transfer the data voltage, and power lines Chigh and Clow that transfer a predetermined voltage. The gate line Gn is divided into the first gate line Gni and the second gate line Gni+1 that are disposed upward and downward in a pixel column direction, and the first gate line Gni and the second gate line Gni+1 are simultaneously applied with the gate on signal or gate off signal.

The first pixel PX(i, j) (i=1, 2, . . . , n, j=1, 2, . . . , m) includes the first gate line Gni among a pair of gate lines (Gni, Gni+1, n is a predetermined integer), the first data line Dj (j is a predetermined integer) and power lines Chigh and Clow, the first switching element Qaj and the second switching element Qbj and a liquid crystal capacitor Clc connected thereto. The first switching element Qaj and the second switching element Qbj are three terminal elements such as a thin film transistor and the like, the control terminal of the first switching element Qaj is connected to the first gate line Gni, the input terminal is connected to the first data line Dj, and the output terminal is connected to the liquid crystal capacitor Clc. The control terminal of the second switching element Qbj is connected to the first gate line Gni, the input terminal is connected to the first power line Chigh among a pair of power lines Chigh and Clow, and the output terminal is connected to the liquid crystal capacitor Clc.

The second pixel PX(i+1, j) that is adjacent to the first pixel PX(i, j) in a pixel column direction includes the second gate line Gni+1 among the pair of gate lines Gni and Gni+1, the second data line Dj' and power lines Chigh and Clow, the third switching element Qcj and the liquid crystal capacitor Clc connected thereto. The third switching element Qcj is a three terminal element such as a thin film transistor and the like, the control terminal of the third switching element Qcj is connected to the second gate line Gni+1 among the pair of gate lines Gni and Gni+1, the input terminal is connected to the second data line Dj', and the output terminal is connected to a terminal of the liquid crystal capacitor Clc. Another terminal of the liquid crystal capacitor Clc of the second pixel PX(i+1, j) is connected to the second switching element Qbj of the first pixel PX(i, j).

The third pixel PX(i, j+1) that is adjacent to the first pixel PX(i, j) in a pixel row direction includes the first gate line Gni among the pair of gate lines Gni and Gni+1, the third data line Dj+1 and power lines Chigh and Clow, the fourth switching element Qaj+1 and the fifth switching element Qbj+1 and the liquid crystal capacitor Clc connected thereto. The fourth switching element Qaj+1 and the fifth switching element Qbj+1 are three terminal elements such as a thin film transistor and the like, the control terminal of the fourth switching element Qaj+1 is connected to the first gate line Gni, the input terminal is connected to the third data line Dj+1, and the output terminal is connected to the liquid crystal capacitor Clc. The control terminal of the fifth switching element Qbj+1 is connected to the first gate line Gni, the input terminal is connected to the second power line Clow among the pair of power lines Chigh and Clow, and the output terminal is connected to the liquid crystal capacitor Clc.

The fourth pixel PX(i+1, j+1) that is adjacent to the second pixel PX(i+1, j) in a pixel row direction includes the second gate line Gni+1 among the pair of gate lines Gni and Gni+1, the fourth data line Dj+1' and power lines Chigh and Clow, the sixth switching element Qcj+1 and the liquid crystal capacitor Clc connected thereto. The sixth switching element Qcj+1 is a three terminal element such as a thin film transistor and the like, the control terminal of the sixth switching element Qcj+1 is connected to the second gate line Gni+1 among the pair of gate lines Gni and Gni+1, the input terminal is connected to the fourth data line Dj+1', and the output terminal is connected to a terminal of the liquid crystal capacitor Clc. Another terminal of the liquid crystal capacitor Clc of the fourth pixel PX(i+1, j+1) is connected to the second switching element Qbj+1 of the third pixel PX(i, j+1).

The first power lines Chigh among a plurality of pairs of power lines Chigh and Clow are connected to each other and applied with the same first voltage, and the second power lines Clow among the plural pairs of power lines Chigh and Clow are connected to each other and applied with the same second voltage even though they are not shown in the drawings. With respect to the reference voltage Vref, the polarities of the first voltage and the second voltage that are applied respectively to the first power line Chigh and the second power line Clow are different from each other. For example, when the reference voltage Vref is 7.5 V, the first voltage may be about 15 V or more, the second voltage may be about 0 V or less, and vice versa.

An example of the driving method of the liquid crystal display according to the present exemplary embodiment will now be described in detail. If the gate-on voltage is applied to the gate line Gn, the first data voltage is applied to the first pixel PX(i, j) through the turned-on first switching element Qaj, the first voltage is applied to the first pixel PX(i, j) and the second pixel PX(i+1, j) through the turned-on second switching element Qbj, and the second data voltage is applied to the second pixel PX(i+1, j) through the turned-on third switching element Qcj. In addition, the third data voltage is applied to the third pixel PX(i, j+1) through the turned-on fourth switching element Qaj+1, the second voltage is applied to the third pixel PX(i, j+1) and the fourth pixel PX(i+1, j+1) through the turned-on fifth switching element Qbj+1, and the fourth data voltage is applied to the fourth pixel PX(i+1, j+1) through the turned-on sixth switching element Qcj+1.

That is, the first data voltage that flows through the first data line Dj is applied through the first switching element Qaj to the first pixel electrode PEa of the first pixel PX(i, j), and the first voltage that flows through the first power line Chigh is applied through the second switching element Qbj to the second pixel electrode PEb. A difference in voltage between the first pixel electrode PEa and the second pixel electrode PEb to which the first data voltage and the first voltage are applied becomes a charge voltage of the liquid crystal capacitor Clc of the first pixel PX(i, j). At this time, the polarities of the first data voltage and the first voltage that are applied to the first pixel electrode PEa of the first pixel PX(i, j) and the second pixel electrode PEb of the first pixel PX(i, j), respectively, are opposites with respect to the reference voltage Vref and the difference in voltage corresponds to the luminance that is displayed by the first pixel PX(i, j).

In addition, the first voltage that flows through the second switching element Qbj from the first power line Chigh is applied to the first pixel electrode PEa of the second pixel PX(i+1, j), and the second data voltage that flows through the third switching element (Qci) from the second data line Dj' is applied to the second pixel electrode PEb of the second pixel PX(i+1, j). At this time, the difference in voltage between the first voltage and the second data voltage that are applied to the first pixel electrode PEa of the second pixel PX(i+1, j) and the second pixel electrode PEb of the second pixel PX(i+1, j), respectively, is a voltage that corresponds to the luminance that is displayed by the second pixel (PX(i, j+1)), and the polarities of these voltages are opposites with respect to the reference voltage Vref. Therefore, the polarities of the first data voltage and the second data voltage may be the same as each other with respect to the reference voltage Vref.

In addition, the third data voltage that flows through the fourth switching element Qaj+1 from the third data line Dj+1 is applied to the first pixel electrode PEa of the third pixel PX(i, j+1), and the second voltage that flows through the fifth switching element Qbj+1 from the second power line Clow is applied to the second pixel electrode PEb of the third pixel PX(i, j+1). A difference in voltage between the first pixel electrode PEa and the second pixel electrode PEb to which the third data voltage and the second voltage are applied, respectively, becomes a charge voltage of the liquid crystal capacitor Clc of the third pixel PX(i, j+1). At this time, the third data voltage and the second voltage that are applied to the first pixel electrode PEa of the third pixel PX(i, j+1) and the second pixel electrode PEb of the third pixel PX(i, j+1), respectively, establish a voltage difference that corresponds to the luminance that is displayed by the third pixel PX(i, j+1), and the polarities thereof are opposites with respect to the reference voltage Vref.

In addition, the second voltage that flows through the fifth switching element Qbj+1 from the second power line Clow is applied to the first pixel electrode PEa of the fourth pixel PX(i+1, j+1), and the fourth data voltage that flows through the sixth switching element Qcj+1 from the fourth data line Dj+1' is applied to the second pixel electrode PEb of the fourth pixel PX(i+1, j+1). At this time, the second voltage and the fourth data voltage that are applied to the first pixel electrode PEa of the fourth pixel PX(i+1, j+1) and the second pixel electrode PEb of the fourth pixel PX(i+1, j+1), respectively, establish a voltage difference that corresponds to the luminance that is displayed by the fourth pixel PX(i+1, j+1), and the polarities thereof are opposites with respect to the reference voltage Vref.

In general, to charge a desired voltage to the liquid crystal capacitor Clc by dividing two pixels that are adjacent in a column direction into two pixel electrodes PEa and PEb, and by applying voltages having different polarities using different switching elements, it may have been necessary to connect the two pixels to the two gate lines to which the gate-on voltage is applied at different times, and two different data lines, or connect the two pixels to one gate line to which the gate-on voltage is applied at the same time and four different data lines. That is, in the case of when two pixels that are adjacent in a column direction are connected to different gate lines, the data voltage is applied through two data lines to the first pixel electrode and the second pixel electrode of the two pixels for different gate-on times, and since the gate-on signals are sequentially applied, a driving speed is slow. In addition, in the case of when two pixels that are adjacent to each other are connected to the gate line to which the same gate-on voltage is applied, since two data voltages should be simultaneously applied to the first pixel electrode and the second pixel electrode of the two pixels, a total of four data lines are required, and in such a case, the number of data lines is increased, so that a cost of the driving unit of the liquid crystal display is increased.

However, the first pixel PX(i) and the second pixel PX(i+1), which are adjacent in a pixel column direction, of the liquid crystal display according to the present exemplary embodiment are connected to the first gate line Gni and the second gate line Gni+1 that are branched lines of the same gate line Gn, and the gate on/off voltages are applied from one gate line Gn connected thereto. Therefore, a driving speed may become more rapid.

In addition, since any one of two pixel electrodes PEa and PEb of the two pixels that are adjacent in a column direction is connected to not the data line but any one of the first power line Chigh and the second power line Clow, the number of data lines is lowered, so that a cost of the driving unit of the liquid crystal display can be lowered.

In addition, the two pixel electrodes that are connected to any one of the first power line Chigh and the second power line Clow do not require an additional switching element by applying the first voltage or the second voltage through one switching element Qbj and Qbj+1, thereby increasing an aperture ratio of the liquid crystal display.

Like this, two pixels that are adjacent in a pixel column direction of the liquid crystal display according to the present exemplary embodiment are connected to each other, thereby being connected to two gate lines to which the gate on/off voltage is simultaneously applied, two data lines and one power line. Accordingly, a driving speed becomes more rapid, the number of data lines is lowered, so that a cost of the driving unit of the liquid crystal display can be lowered and the aperture ratio of the liquid crystal display is increased. By the signal line and pixel arrangement of the liquid crystal display according to the present exemplary embodiment, as compared to the arrangement of the general signal line and pixel, an additional two power lines are provided, but since the same voltage is always applied to each of the power lines, only a simple driving unit may be added to apply the voltage having a predetermined value, so that the driving method is simple and the manufacturing cost is low.

The arrangement and driving method of the signal lines and pixels of the liquid crystal display according to the exemplary embodiment may be applied to all pixel structures that include the first pixel electrode and the second pixel electrode having at least a portion formed on the same layer and alternately disposed.

Figure 6:
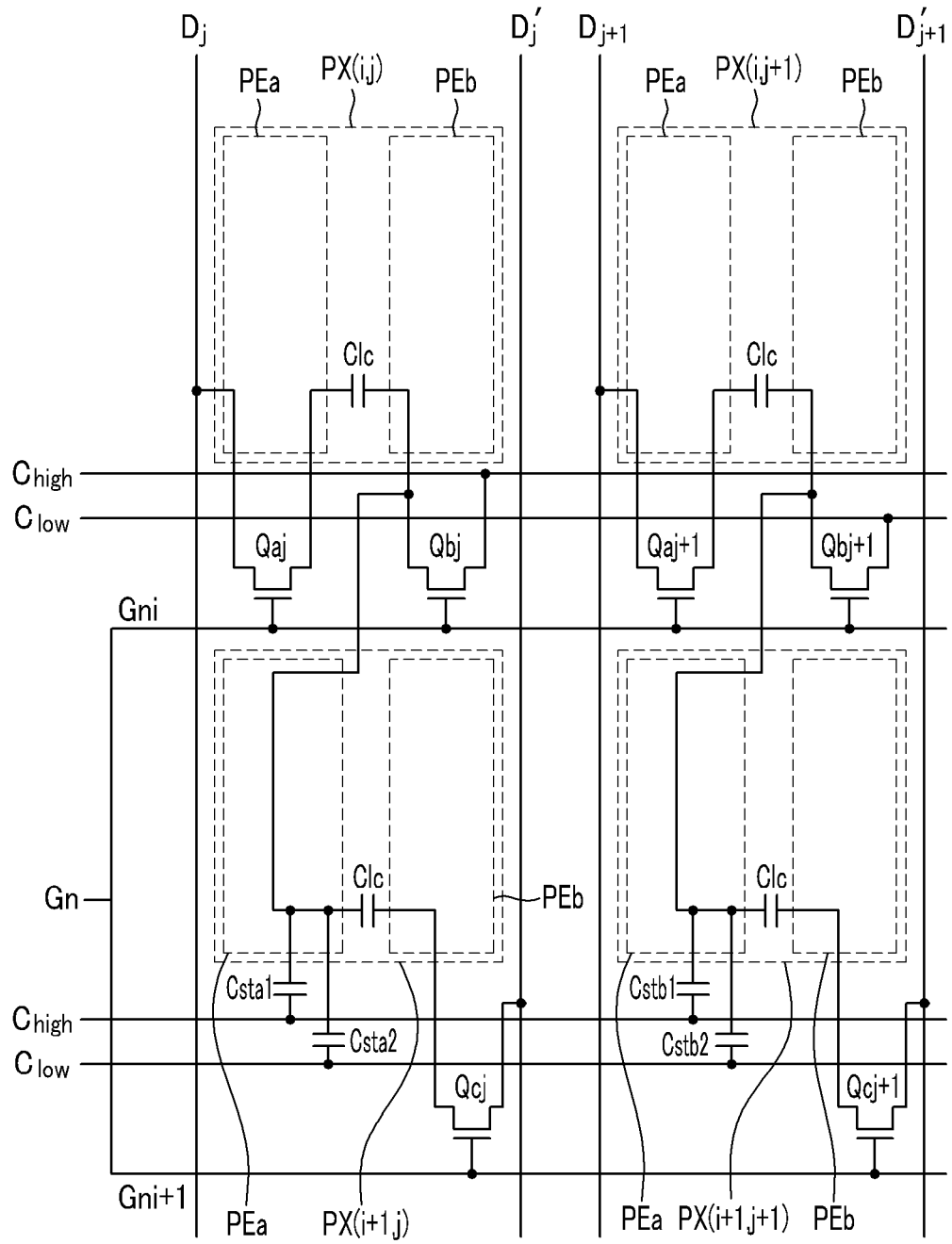
FIG. 6 is an equivalent circuit diagram illustrating four pixels of the liquid crystal display according to an exemplary embodiment of the present invention.

With reference to FIG. 2 and FIG. 6, arrangement of the signal lines and the pixels of the liquid crystal display according to another exemplary embodiment of the present invention will be described. FIG. 6 is an equivalent circuit diagram illustrating four pixels of the liquid crystal display according to the exemplary embodiment of the present invention.

The arrangement of the signal lines and the pixels of the liquid crystal display that is shown in FIG. 6 is similar to the arrangement of the signal lines and the pixels that are shown in FIG. 5. With reference to FIG. 6, the liquid crystal display according to the present exemplary embodiment includes a plurality of the first pixels PX(i, j) and a plurality of the second pixels PX(i+1, j) that are adjacent in a pixel column direction, a plurality of the third pixels PX(i, j+1) and a plurality of the fourth pixels PX(i+1, j+1) that are adjacent to a plurality of the first pixels PX(i, j) and a plurality of the second pixels PX(i+1, j), respectively, in a pixel row direction, and a plurality of signal lines (Gni, Gni+1, Dj, Dj', Dj+1, Dj+1', Chigh, Clow) that are connected thereto. However, unlike the exemplary embodiment of the liquid crystal display that is shown in FIG. 5, the first power line Chigh and the second power line Clow are disposed at the lower part of the second pixel PX(i+1, j) and the fourth pixel PX(i+1, j+1), and the current exemplary embodiment includes the first pixel electrode PEa of the second pixel PX(i+1, j) connected to storage capacitors Csta1 and Csta2 having terminals that are connected to the first power line Chigh and the second power line Clow, respectively, the second pixel electrode PEb of the fourth pixel PX(i+1, j+1) connected to storage capacitors Cstb1 and Cstb2 having terminals that are connected to the first power line Chigh and the second power line Clow, respectively. The voltage that is applied to the pixel electrode may be maintained and light leakage that occurs at the lower part of the second pixel PX(i+1, j) and the fourth pixel PX(i+1, j+1) may be prevented by including the storage capacitors Cstb1 and Cstb2.

The first power line Chigh and the second power line Clow that are disposed at the lower part of the second pixel PX(i+1, j) and the fourth pixel PX(i+1, j+1) are connected to the respective first power line Chigh and the second power line Clow that are disposed between the first pixel PX(i, j) and the second pixel PX(i+1, j), and between the third pixel PX(i, j+1) and the fourth pixel PX(i+1, j+1), and the same first voltage and the same second voltage are applied thereto.

Two pixels that are adjacent in a pixel column direction of the liquid crystal display according to the present exemplary embodiment are connected to each other, thereby being connected to two gate lines to which the gate on/off voltage is simultaneously applied, two data lines and one power line. Accordingly, a driving speed becomes more rapid, the number of data lines is lowered, so that a cost of the driving unit of the liquid crystal display can be lowered and the aperture ratio of the liquid crystal display is increased.

Many characteristics of the exemplary embodiment shown in FIG. 5 may be applied to the liquid crystal display of the present exemplary embodiment shown in FIG. 6.

Figure 7:
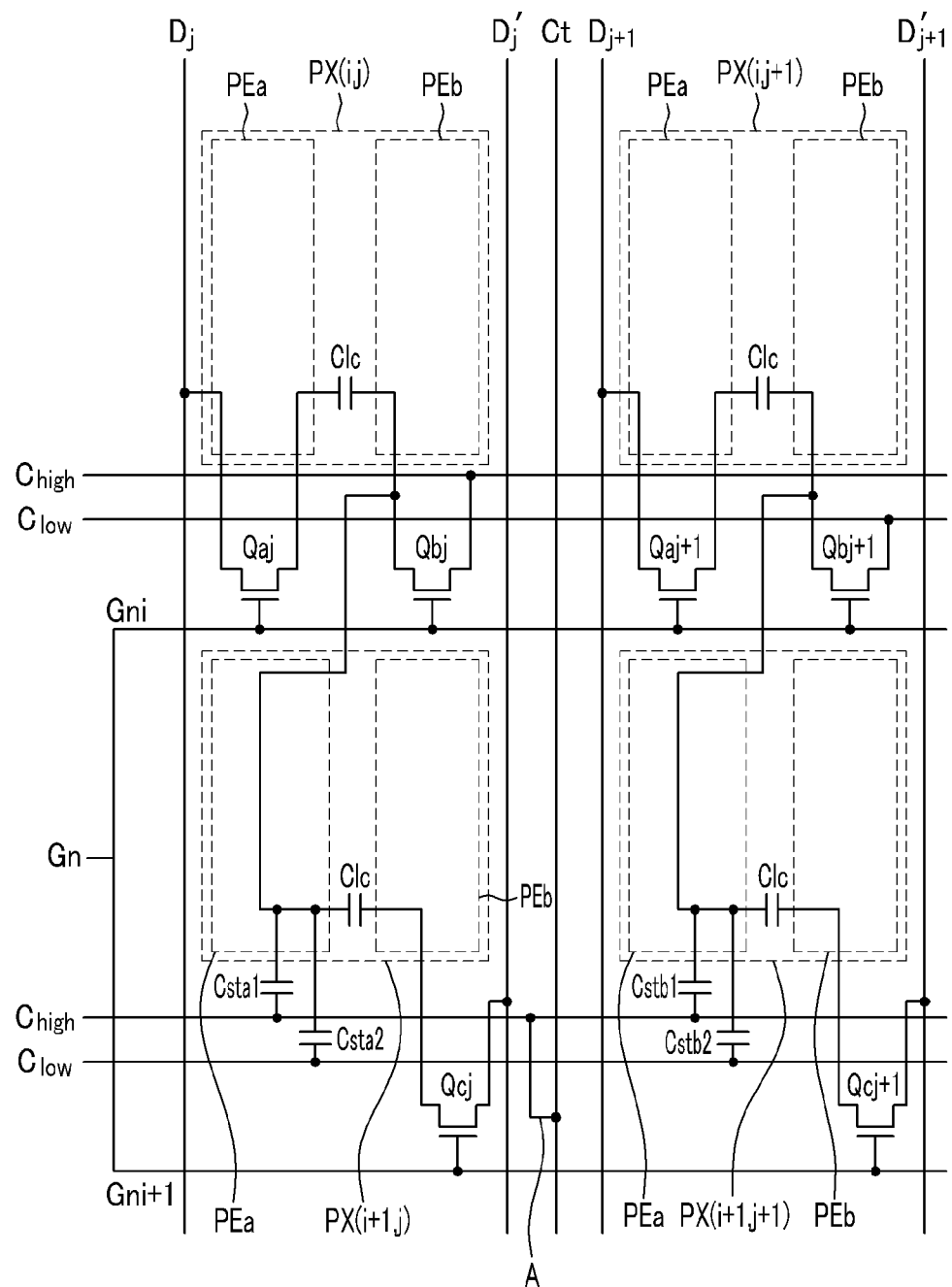
FIG. 7 is an equivalent circuit diagram illustrating four pixels of the liquid crystal display according to an exemplary embodiment of the present invention.

Next, with reference to FIG. 2 and FIG. 7, arrangement of the signal lines and the pixels of the liquid crystal display according to another exemplary embodiment of the present invention will be described. FIG. 7 is an equivalent circuit diagram illustrating four pixels of the liquid crystal display according to the exemplary embodiment of the present invention.

The arrangement of the signal lines and the pixels of the liquid crystal display that is shown in FIG. 7 is similar to the arrangement of the signal lines and the pixels that are shown in FIG. 5 and FIG. 6. With reference to FIG. 7, the liquid crystal display according to the present exemplary embodiment includes a plurality of the first pixels PX(i, j) and a plurality of the second pixels PX(i+1, j) that are adjacent in a pixel column direction, a plurality of the third pixels PX(i, j+1) and a plurality of the fourth pixels PX(i+1, j+1) that are adjacent to the plurality of the first pixels PX(i, j) and the plurality of the second pixels PX(i+1, j), respectively, in a pixel row direction, and a plurality of signal lines (Gni, Gni+1, Dj', Dj+1, Dj+1', Chigh, Clow) that are connected thereto. However, unlike the exemplary embodiment of the liquid crystal display that is shown in FIG. 5, the first power line Chigh and the second power line Clow are disposed at the lower part of the second pixel PX(i+1, j) and the fourth pixel PX(i+1, j+1), and the current exemplary embodiment of the liquid crystal display includes the first pixel electrode PEa of the second pixel PX(i+1, j) connected to storage capacitors Csta1 and Csta2 having terminals that are connected to the first power line Chigh and the second power line Clow, respectively, and the second pixel electrode PEb of the fourth pixel PX(i+1, j+1) connected to storage capacitors Cstb1 and Cstb2 having terminals that are connected to the first power line Chigh and the second power line Clow, respectively. In addition, unlike the exemplary embodiment of the liquid crystal display that is shown in FIG. 6, the current exemplary embodiment of the liquid crystal display further includes a third power line Ct that is disposed between the second data line Dj' and the third data line Dj+1, wherein the third power line Ct is connected to any one of the first power line Chigh and the second power line Clow through a connection portion A.

The third power line Ct may be parallel to the data lines, and may be formed on the same layer as the data lines. The third power line Ct may be formed on a layer that is different from the first power line Chigh and the second power line Clow. The third power line Ct is connected to any one of the first power line Chigh and the second power line Clow and the first voltage or the second voltage is additionally applied thereto, so that a signal delay of the first power line Chigh or the second power line Clow that extends in a pixel row direction may be prevented. Even though not shown in the drawings, the connection portion A for connecting the third power line Ct to any one of the first power line Chigh and the second power line Clow is formed on different layers, and may be a connecting member that electrically connects a portion of the third power line Ct which is exposed through a contact hole to portions of the first power line Chigh or the second power line Clow.

Even though not shown in the drawings, the third power line Ct may be disposed every three pixels, and the third power line Ct that applies the first voltage and the third power line Ct that applies the second voltage may be alternately arranged. By this, the third power line Ct that applies the first voltage and the third power line Ct that applies the second voltage may each be disposed every six pixel columns.

Two pixels that are adjacent in a pixel column direction of the liquid crystal display according to the present exemplary embodiment are connected to each other, thereby being connected to two gate lines to which the gate on/off voltage is simultaneously applied, two data lines and one power line. Accordingly, a driving speed becomes more rapid, the number of data lines is lowered, so that a cost of the driving unit of the liquid crystal display can be lowered and the aperture ratio of the liquid crystal display is increased. By including the third power line Ct that applies the first voltage or the second voltage and additionally applying the first voltage or the second voltage, the signal delay of the first power line Chigh or the second power line Clow that extends in a pixel row direction may be prevented. In the exemplary embodiment illustrated in FIG. 7, even though the third power line Ct is shown connected to the first power line Chigh it is not limited thereto, that is, the present exemplary embodiment may include an additional power line that is connected to the second power line Clow or to the first power line Chigh and is parallel to the data lines. In addition, any one of the third power line Ct and the additional power line may be disposed at every pixel column.

Many characteristics of the exemplary embodiment shown in FIG. 5 or FIG. 6 may be applied to the liquid crystal display of the present exemplary embodiment shown in FIG. 7.

Figure 8:
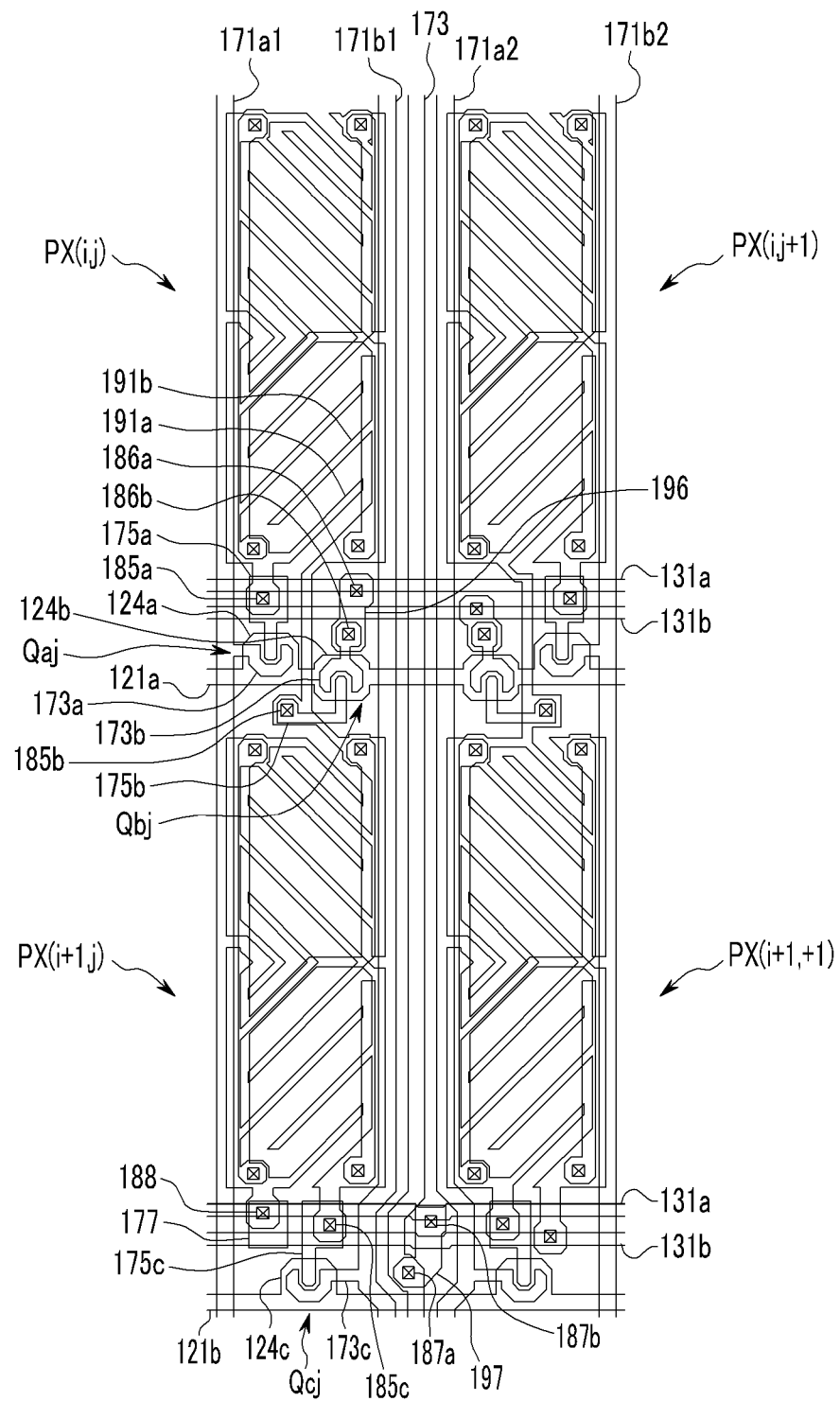
FIG. 8 illustrates an example of a pixel structure of the liquid crystal display that is shown in FIG. 6.

With reference to FIG. 8, an example of a pixel structure of the liquid crystal display that is shown in FIG. 6 will be described. FIG. 8 illustrates an example of a pixel structure of the liquid crystal display that is shown in FIG. 6.

With reference to FIG. 8, the liquid crystal display according to the present exemplary embodiment includes the first pixels PX(i, j) and the second pixels PX(i+1, j) that are adjacent in a pixel column direction, the third pixels PX(i, j+1) and the fourth pixels PX(i+1, j+1) that are adjacent to the first pixels PX(i, j) and the second pixels PX(i+1, j) in a pixel row direction, and gate lines 121a and 121b, data lines 171a1, 171b1, 171a2, 171b2, the first power lines 131a, the second power lines 131b and the third power line 173 that are connected thereto. The first power lines 131a and the second power lines 131b may be formed on the same layer as the gate lines 121a and 121b, and the third power line 173 may be formed on the same layer as the data lines 171a1, 171b1, 171a2, and 171b2.

The first pixel PX(i, j) includes the first pixel electrode 191a and the second pixel electrode 191b that are connected to the first switching element Qaj and the second switching element Qbj, respectively. The first switching element Qaj and the second switching element Qbj are three terminal elements such as thin film transistors and the like, respective control electrodes are the first gate electrode 124a and the second gate electrode 124b, respective input electrodes are the first source electrode 173a and the second source electrode 173b, and respective output electrodes are the first drain electrode 175a and the second drain electrode 175b. The first source electrode 173a is connected to the first data line 171a1, and the second source electrode 173b is connected to the first power line 131a. The second pixel PX(i+1, j) includes the first pixel electrode 191a that is connected to the second switching element Qbj and the second pixel electrode 191b that is connected to the third switching element Qcj. The third switching element is a three terminal element such as a thin film transistor and the like, the control electrode is the third gate electrode 124c, the input electrode is the third source electrode 173c, and the output electrode is the third drain electrode 175c.

The first drain electrode 175a is connected to the first pixel electrode 191a of the first pixel PX(i, j) through the contact hole 185a, the second drain electrode 175b is connected to the second pixel electrode 191b of the first pixel PX(i, j) and the first pixel electrode 191a of the second pixel PX(i+1, j) through the contact hole 185b, and the third drain electrode 175c is connected to the second pixel electrode 191b of the second pixel PX(i+1, j) through the contact hole 185c. The first power line 131a may be electrically connected to the second source electrode 173b that are exposed through respective contact holes 186a and 186b and through a connecting member 196 that covers the first power line 131a. The connecting member 196 may be formed on the same layer as the first pixel electrode 191a or the second pixel electrode 191b. In addition, the third power line 173 may be electrically connected to the first power line 131a that are exposed through respective contact holes 187a and 187b and through a connecting member 197 that covers the third power line 173. The first pixel electrode 191a and the second pixel electrode 191b of each pixel are formed on the same layer and alternately disposed.

The first power line 131a and the second power line 131b that are disposed at the lower part of the second pixel PX(i+1, j) overlap the storage conductor 177 that is connected through the contact hole 188 to the first pixel electrode 191a to form the storage capacitor. The storage conductor 177 may be formed on the same layer as the data lines 171a1, 171b1, 171a2, and 171b2.

The first power line 131a and the second power line 131b that are disposed at the lower part of the second pixel PX(i+1, j) may prevent light leakage at the lower part of the second pixel PX(i+1, j).

Many characteristics of the liquid crystal display according to the exemplary embodiments shown in FIG. 5, FIG. 6 and FIG. 7 may be applied to the liquid crystal display according to the present exemplary embodiment shown in FIG. 8.

Figure 9:
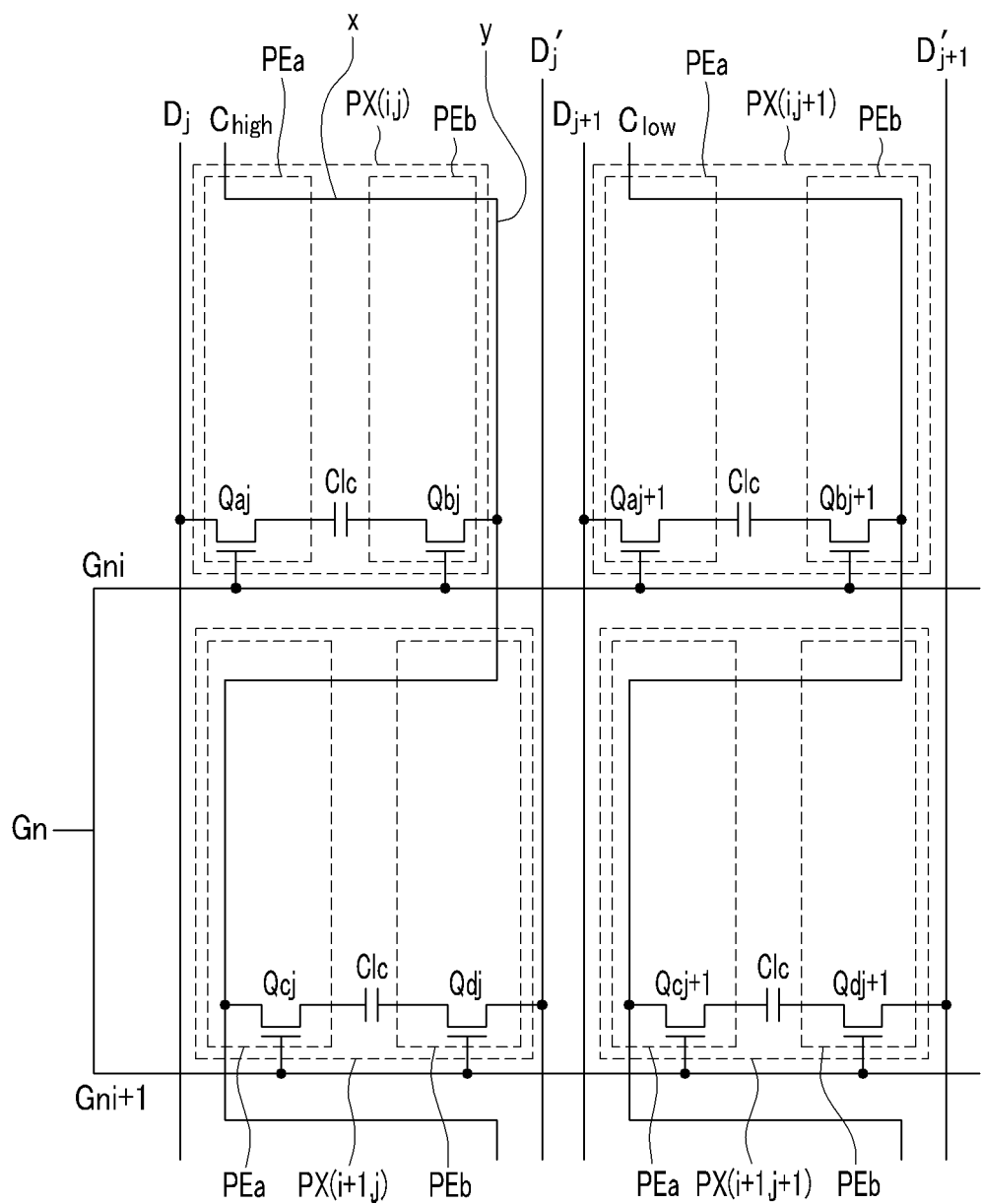
FIG. 9 is an equivalent circuit diagram illustrating four pixels of the liquid crystal display according to an exemplary embodiment of the present invention.

Next, with reference to FIG. 2 and FIG. 9, arrangement of the signal lines and the pixels of the liquid crystal display according to another exemplary embodiment of the present invention will be described. FIG. 9 is an equivalent circuit diagram illustrating four pixels of the liquid crystal display according to the exemplary embodiment of the present invention.

With reference to FIG. 2 and FIG. 9, the present exemplary embodiment of the liquid crystal display includes a plurality of the first pixels PX(i, j) and a plurality of the second pixels PX(i+1, j) that are adjacent in a pixel column direction, a plurality of the third pixels PX(i, j+1) and a plurality of the fourth pixels PX(i+1, j+1) that are adjacent to a plurality of the first pixels PX(i, j) and a plurality of the second pixels PX(i+1, j) in a pixel row direction, and a plurality of signal lines (Gni, Gni+1, Dj, Dj', Dj+1, Dj+1', Chigh, Clow) that are connected thereto. The signal lines (Gni, Gni+1, Dj, Dj', Dj+1, Dj+1', Chigh, Clow) include a gate line Gn that transfers a gate signal (it may be called a "scanning signal"), data lines (Dj and Dj', Dj+1 and Dj+1') that transfer the data voltage, and power lines Chigh and Clow that transfer a predetermined voltage. The gate line Gn is divided into the first gate line Gni and the second gate line Gni+1 that are disposed upward and downward in a pixel column direction, and the first gate line Gni and the second gate line Gni+1 are simultaneously applied with the gate on signal or gate off signal.

The power lines Chigh and Clow include a first portion (x) that is parallel to the gate lines Gni and Gni+1 and a second portion (y) that is parallel to the data lines (Dj and Dj', Dj+1 and Dj+1'). The first portion (x) that is parallel to the gate lines Gni and Gni+1 may prevent light leakage between two pixels that are adjacent in a column direction, and the second portion (y) that is parallel to the data lines (Dj and Dj', Dj+1 and Dj+1') may prevent light leakage between two pixels that are disposed adjacent in a row direction between the pixel electrode and the data line and prevent coupling between the pixel electrode and the data line.

The first pixel PX(i, j) includes the first gate line Gni among a pair of gate lines (Gni, Gni+1, n is a predetermined integer), the first data line Dj (j is a predetermined integer) and power lines Chigh and Clow, a first switching element Qaj and a second switching element Qbj and a liquid crystal capacitor Clc connected thereto. The first switching element Qaj and the second switching element Qbj are three terminal elements such as thin film transistors and the like, the control terminal of the first switching element Qaj is connected to the first gate line Gni, the input terminal is connected to the first data line Dj, and the output terminal is connected to the liquid crystal capacitor Clc. The control terminal of the second switching element Qbj is connected to the first gate line Gni, the input terminal is connected to the first power line Chigh among a pair of power lines Chigh and Clow, and the output terminal is connected to the liquid crystal capacitor Clc.

The second pixel PX(i+1, j) that is adjacent to the first pixel PX(i, j) in a pixel column direction includes the second gate line Gni+1 among the pair of gate lines Gn and Gni+1, the second data line Dj' and the first power line Chigh, a third switching element (Qcj), a fourth switching element Qdj and the liquid crystal capacitor Clc connected thereto. The third switching element Qcj and the fourth switching element Qdj are three terminal elements such as a thin film transistor and the like, the control terminal of the third switching element Qcj is connected to the second gate line Gni+1 among the pair of gate lines Gni and Gni+1, the input terminal is connected to the first power line Chigh among the pair of power lines Chigh and Clow, and the output terminal is connected to a terminal of the liquid crystal capacitor Clc. The control terminal of the fourth switching element Qdj is connected to the second gate line Gni+1, the input terminal is connected to the second data line Dj', and the output terminal is connected to one terminal of the liquid crystal capacitor Clc.

The third pixel PX(i, j+1) that is adjacent to the first pixel PX(i, j) in a pixel row direction includes the first gate line Gni among the pair of gate lines Gni and Gni+1, the third data line Dj+1 and power lines Chigh and Clow, a fifth switching element Qaj+1 and a sixth switching element Qbj+1 and the liquid crystal capacitor Clc connected thereto. The fifth switching element Qaj+1 and the sixth switching element Qbj+1 are three terminal elements such as a thin film transistor and the like, the control terminal of the fifth switching element Qaj+1 is connected to the first gate line Gni, the input terminal is connected to the third data line Dj+1, and the output terminal is connected to the liquid crystal capacitor Clc. The control terminal of the sixth switching element Qbj+1 is connected to the first gate line Gni, the input terminal is connected to the second power line Clow among the pair of power lines Chigh and Clow, and the output terminal is connected to the liquid crystal capacitor Clc.

The fourth pixel PX(i+1, j+1) that is adjacent to the second pixel PX(i+1, j) in a pixel row direction includes the second gate line Gni+1 among the pair of gate lines Gni and Gni+1, the fourth data line Dj+1' and the second power line Clow, a seventh switching element Qcj+1 and an eighth switching element Qdj+1 and the liquid crystal capacitor Clc connected thereto. The seventh switching element Qcj+1 and the eighth switching element Qdj+1 are three terminal elements such as thin film transistors and the like, the control terminal of the seventh switching element Qcj+1 is connected to the second gate line Gni+1 among the pair of gate lines Gni and Gni+1, the input terminal is connected to the second power line Clow, and the output terminal is connected to a terminal of the liquid crystal capacitor Clc.

The control terminal of the eighth switching element Qdj+1 is connected to the second gate line Gni+1, the input terminal is connected to the fourth data line Dj+1', and the output terminal is connected to one terminal of the liquid crystal capacitor Clc.

The first power lines Chigh among a plurality of pairs of power lines Chigh and Clow are connected to each other and applied with the same first voltage, and second power lines Clow among the plural pairs of power lines Chigh and Clow are connected to each other and applied with the same second voltage even though not shown in the drawings. With respect to the reference voltage Vref, the polarities of the first voltage and the second voltage that are applied to the first power line Chigh and the second power line Clow, respectively, are different from each other. For example, when the reference voltage Vref is 7.5 V, the first voltage may be about 15 V or more, the second voltage may be about 0 V or less, and vice versa.

An example of the driving method of the liquid crystal display according to the present exemplary embodiment will now be described in detail. If the gate-on voltage is applied to the gate line Gn, the first data voltage is applied to the first pixel PX(i, j) through the turned-on first switching element Qaj, the first voltage is applied to the first pixel PX(i, j) and the second pixel PX(i+1, j) through the turned-on second switching element Qbj and the third switching element Qcj, respectively, and the second data voltage is applied to the second pixel PX(i+1, j) through the turned-on fourth switching element Qdj. In addition, the third data voltage is applied to the third pixel PX(i, j+1) through the turned-on fifth switching element is Qaj+1, the second voltage is applied to the third pixel PX(i, j+1) and the fourth pixel PX(i+1, j+1) through the turned-on sixth switching element Qbj+1 and the seventh switching element Qbj+1, respectively, and the fourth data voltage is applied to the fourth pixel PX(i+1, j+1) through the turned-on eighth switching element Qdj+1.

That is, the first data voltage that flows through the first data line Dj is applied through the first switching element Qaj to the first pixel electrode PEa of the first pixel PX(i, j), and the first voltage that flows through the first power line Chigh is applied through the second switching element Qbj to the second pixel electrode PEb. A difference in voltage between the first pixel electrode PEa and the second pixel electrode PEb to which the first data voltage and the first voltage are respectively applied becomes a charge voltage of the liquid crystal capacitor Clc of the first pixel PX(i, j). At this time, the polarities of the first data voltage and the first voltage that are applied to the first pixel electrode PEa of the first pixel PX(i, j) and the second pixel electrode PEb of the first pixel PX(i, j), respectively, are opposites with respect to the reference voltage Vref and the difference in voltage corresponds to the luminance that is displayed by the first pixel PX(i, j).

In addition, the first voltage that flows through the third switching element Qcj from the first power line Chigh is applied to the first pixel electrode PEa of the second pixel PX(i+1, j), and the second data voltage that flows through the fourth switching element Qdj from the second data line Dj' is applied to the second pixel electrode PEb of the second pixel PX(i+1, j). At this time, the difference in voltage between the first voltage and the second data voltage that are applied to the first pixel electrode PEa of the second pixel PX(i+1, j) and the second pixel electrode PEb of the second pixel PX(i+1, j), respectively, is a voltage that corresponds to the luminance that is displayed by the second pixel PX(i+1, j), and the polarities thereof are is opposites with respect to the reference voltage Vref. Therefore, the polarities of the first data voltage and the second data voltage may be the same as each other with respect to the reference voltage Vref.

In addition, the third data voltage that flows through the fifth switching element Qaj+1 from the third data line Dj+1 is applied to the first pixel electrode PEa of the third pixel PX(i, j+1), and the second voltage that flows through sixth switching element Qbj+1 from the second power line Clow is applied to the second pixel electrode PEb of the third pixel PX(i, j+1). A difference in voltage between the first pixel electrode PEa and the second pixel electrode PEb to which the third data voltage and the second voltage are respectively applied becomes a charge voltage of the liquid crystal capacitor Clc of the third pixel PX(i, j+1). At this time, the third data voltage and the second voltage that are applied to the first pixel electrode PEa of the third pixel PX(i, j+1) and the second pixel electrode PEb of the third pixel PX(i, j+1), respectively, establish a voltage difference that corresponds to the luminance that is displayed by the third pixel PX(i, j+1), and the polarities thereof are opposites with respect to the reference voltage Vref.

In addition, the second voltage that flows through the seventh switching element Qcj+1 from the second power line Clow is applied to the first pixel electrode PEa of the fourth pixel PX(i+1, j+1), and the fourth data voltage that flows through the eighth switching element Qdj+1 from the fourth data line Dj+1' is applied to the second pixel electrode PEb of the fourth pixel PX(i+1, j+1). At this time, the second voltage and the fourth data voltage that are applied to the first pixel electrode PEa of the fourth pixel PX(i+1, j+1) and the second pixel electrode PEb of the fourth pixel PX(i+1, j+1), respectively, establish a voltage difference that corresponds to the luminance that is displayed by the fourth pixel PX(i+1, j+1), and the polarities thereof are opposites with respect to the reference voltage Vref.

However, the first pixel PX(i) and the second pixel PX(i+1), which are adjacent in a pixel column direction of the liquid crystal display according to the present exemplary embodiment are connected to the first gate line Gni and the second gate line Gni+1 that are branched lines of the same gate line Gn, and the gate on/off voltages are applied from one gate line Gn connected thereto. Therefore, a driving speed may become more rapid.

In addition, since any one of two pixel electrodes PEa and PEb of two pixels that are adjacent in a column direction is connected to not the data line but any one of the first power line Chigh and the second power line Clow, the number of data lines is lowered, so that a cost of the driving unit of the liquid crystal display can be lowered.

In addition, the power lines Chigh and Clow of the liquid crystal display according to the present exemplary embodiment each include a first portion (x) that is parallel to the gate lines Gni and Gni+1 and a second portion (y) that is parallel to the data lines (Dj and Dj', Dj+1 and Dj+1'). The first portion (x) that is parallel to the gate lines Gni and Gni+1 may prevent light leakage between two pixels that are adjacent in a column direction, and the second portion (y) that is parallel to the data lines (Dj and Dj', Dj+1 and Dj+1') may prevent light leakage between two pixels that are disposed adjacent in a row direction between the pixel electrode and the data line and prevent coupling between the pixel electrode and the data line.

Like this, two pixels that are adjacent in a pixel column direction of the liquid crystal display according to the present exemplary embodiment are connected to each other, thereby being connected to two gate lines to which the gate on/off voltage is simultaneously applied, two data lines and one power line. Accordingly, a driving speed becomes more rapid, and the number of data lines is lowered, so that a cost of the driving unit of the liquid crystal is display can be lowered. By the signal line and pixel arrangement of the liquid crystal display according to the present exemplary embodiment, as compared to the arrangement of the general signal line and pixel arrangement, two additional power lines are provided, but since the same voltage is always applied to each of the power lines, only a simple driving unit may be added to apply the voltage having a predetermined value, so that the driving method is simple and the manufacturing cost is low.

The arrangement and driving method of the signal line and pixel of the liquid crystal display according to the exemplary embodiment may be applied to all pixel structures that include the first pixel electrode and the second pixel electrode which are formed on the same layer or at least respective portions thereof are formed on the same layer and alternately disposed.

Figure 10:
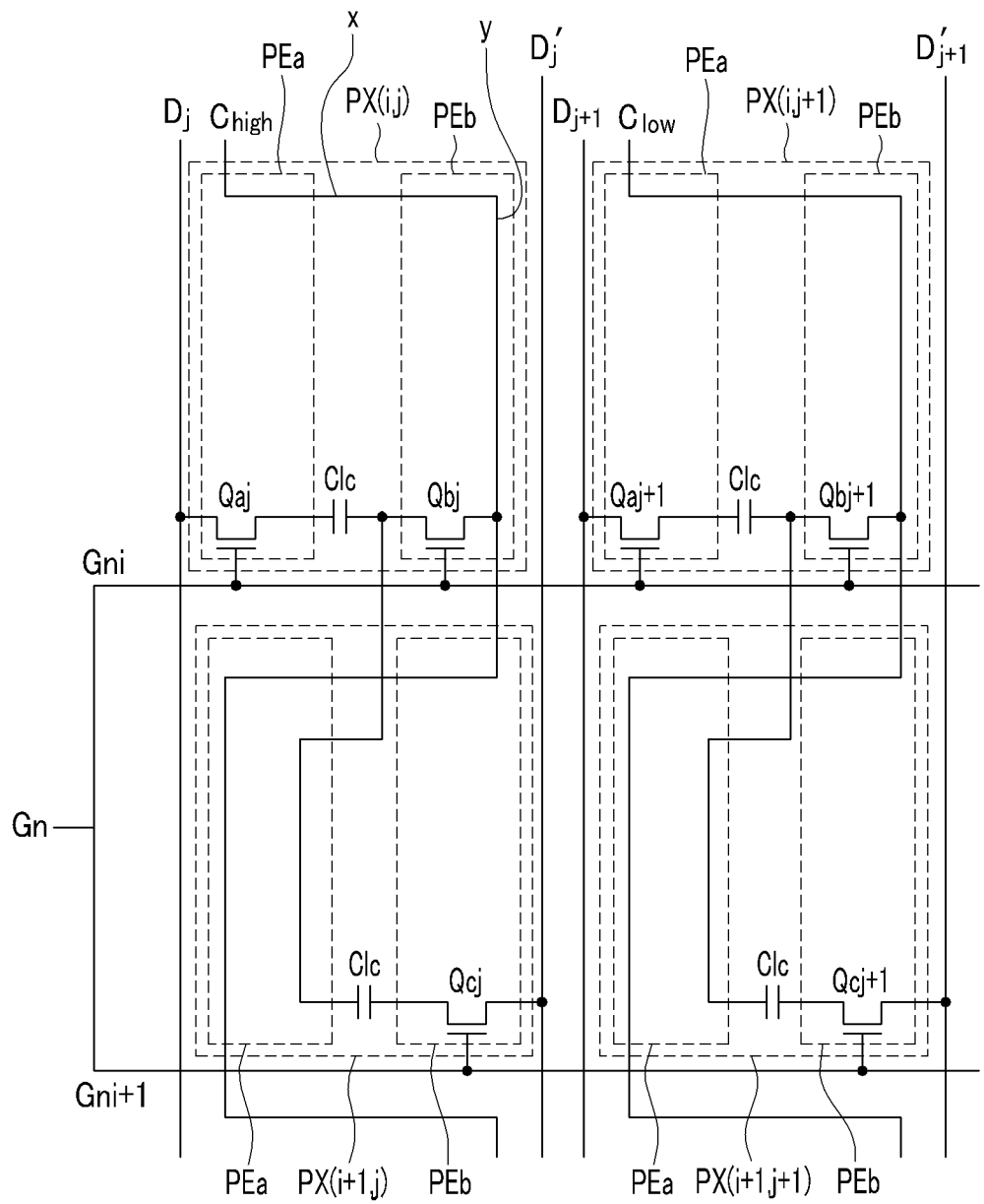
FIG. 10 is an equivalent circuit diagram illustrating four pixels of the liquid crystal display according to an exemplary embodiment of the present invention.

Next, with reference to FIG. 2 and FIG. 10, the liquid crystal display according to another exemplary embodiment of the present invention will be described. FIG. 10 is an equivalent circuit diagram illustrating four pixels of the liquid crystal display according to the exemplary embodiment of the present invention.

The arrangement of the signal lines and the pixels of the liquid crystal display that is shown in FIG. 6 is similar to the arrangement of the signal lines and the pixels that are shown in FIG. 5. With reference to FIG. 10, the liquid crystal display according to the present exemplary embodiment includes a plurality of the first pixels PX(i, j) and a plurality of the second pixels PX(i+1, j) that are adjacent in a pixel column direction, a plurality of the third pixels PX(i, j+1) and a plurality of the fourth pixels PX(i+1, j+1) that are adjacent to the plurality of the first pixels PX(i, j) and the plurality of the second pixels PX(i+1, j) in a pixel row direction, and a plurality of signal lines (Gni, Gni+1, Dj, Dj', Dj+1, Dj+1', Chigh, Clow) that are is connected thereto. However, unlike the exemplary embodiment of the liquid crystal display that is shown in FIG. 5, the power lines Chigh and Clow of the liquid crystal display according to the present exemplary embodiment includes a first portion (x) that is parallel to the gate lines Gni and Gni+1 and a second portion (y) that is parallel to the data lines (Dj and Dj', Dj+1 and Dj+1'). The first portion (x) that is parallel to the gate lines Gni and Gni+1 may prevent light leakage between two pixels that are adjacent in a column direction, and the second portion (y) that is parallel to the data lines (Dj and Dj', Dj+1 and Dj+1') may prevent light leakage between two pixels that are disposed adjacent in a row direction between the pixel electrode and the data line and prevent coupling between the pixel electrode and the data line.

Two pixels that are adjacent in a pixel column direction of the liquid crystal display according to the present exemplary embodiment are connected to each other, thereby being connected to two gate lines to which the gate on/off voltage is simultaneously applied, two data lines and one power line. Accordingly, a driving speed becomes more rapid, the number of data lines is lowered, so that a cost of the driving unit of the liquid crystal display can be lowered, the aperture ratio of the liquid crystal display can be increased, light leakage between two pixels that are adjacent to each other can be prevented, and coupling between the pixel electrode and the data line can be prevented.

Figure 11:
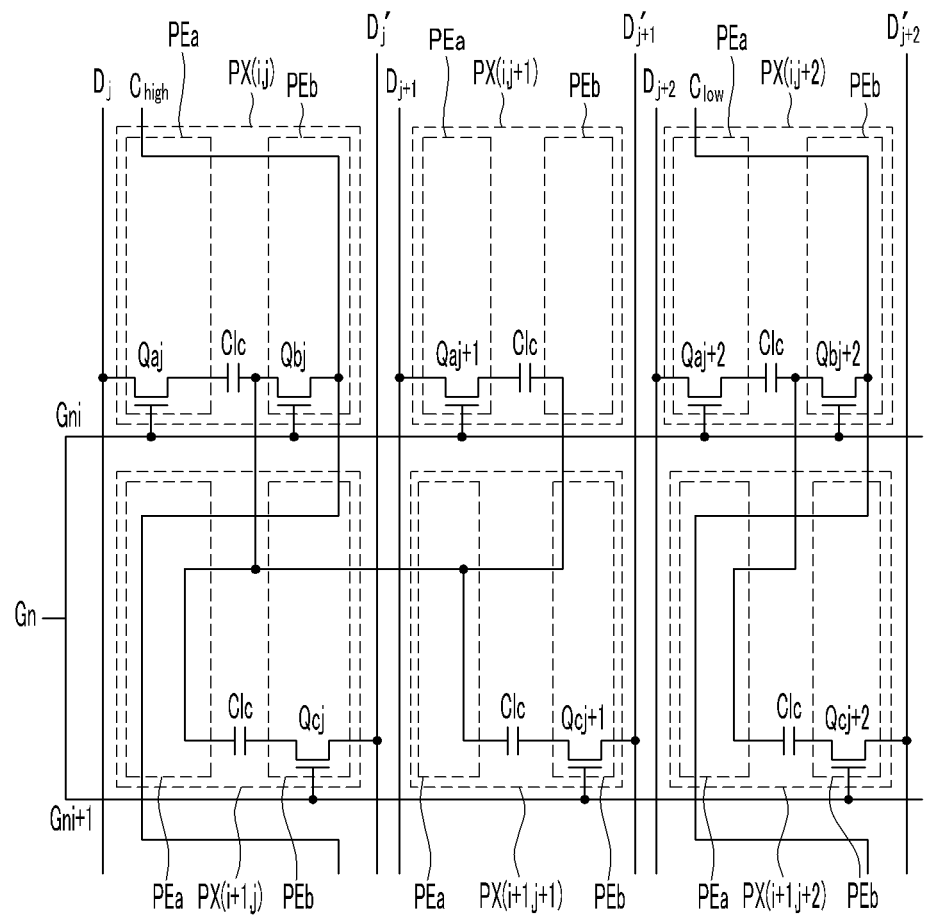
FIG. 11 is an equivalent circuit diagram illustrating six pixels of the liquid crystal display according to an exemplary embodiment of the present invention.

Next, with reference to FIG. 2 and FIG. 11, the liquid crystal display according to another exemplary embodiment of the present invention will be described. FIG. 11 is an equivalent circuit diagram illustrating six pixels of the liquid crystal display according to the exemplary embodiment of the present invention.

With reference to FIG. 2 and FIG. 11, the liquid crystal display according to the present exemplary embodiment includes a plurality of the first pixels PX(i, j) and a plurality of the second pixels PX(i+1, j) that are adjacent in a pixel column direction, a plurality of the third pixels PX(i, j+1) and a plurality of the fourth pixels PX(i+1, j+1) that are adjacent to a plurality of the first pixels PX(i, j) and a plurality of the second pixels PX(i+1, j), respectively, in a pixel row direction, a plurality of the fifth pixels PX(i, j+2) and a plurality of the sixth pixels PX(i+1 and j+2) that are adjacent to a plurality of the third pixels PX(i, j+1) and a plurality of the fourth pixels PX(i+1, j+1), respectively, in a pixel row direction, and a plurality of signal lines (Gni, Gni+1, Dj, Dj', Dj+1, Dj+1', Dj+2, Dj+2', Chigh, Clow) that are connected thereto. The signal lines (Gni, Gni+1, Dj, Dj', Dj+1, Dj+1', Dj+2, Dj+2', Chigh, Clow) include a gate line Gn that transfers a gate signal (it may be called a "scanning signal"), data lines (Dj and Dj', Dj+1 and Dj+1', Dj+2, Dj+2') that transfer the data voltages, and power lines Chigh and Clow that transfer predetermined voltages. The gate line Gn is divided into the first gate line Gni and the second gate line Gni+1 that are disposed upward and downward in a pixel column direction, and the first gate line Gni and the second gate line Gni+1 are simultaneously applied with the gate on signal or the gate off signal.

The first pixel PX(i, j) includes the first gate line Gni among a pair of gate lines (Gni, Gni+1, n is a predetermined integer), the first data line Dj (j is a predetermined integer) and power lines Chigh and Clow, the first switching element Qaj and the second switching element Qbj and a liquid crystal capacitor Clc connected thereto. The first switching element Qaj and the second switching element Qbj are three terminal elements such as a thin film transistor and the like, the control terminal of the first switching element Qaj is connected to the first gate line Gni, the input terminal is connected to the first data line Dj, and the output terminal is connected to the liquid crystal capacitor Clc. The control terminal of the second switching element Qbj is connected to the first gate line Gni, the input terminal is connected to the first power line Chigh is among a pair of power lines Chigh and Clow, and the output terminal is connected to the liquid crystal capacitor Clc.

The second pixel PX(i+1, j) that is adjacent to the first pixel PX(i, j) in a pixel column direction includes the second gate line Gni+1 among the pair of gate lines Gni and Gni+1, the second data line Dj' and power lines Chigh and Clow, the third switching element (Qcj) and the liquid crystal capacitor Clc connected thereto. The third switching element Qcj is a three terminal element such as a thin film transistor and the like, the control terminal of the third switching element Qcj is connected to the second gate line Gni+1 among the pair of gate lines Gni and Gni+1, the input terminal is connected to the second data line Dj', and the output terminal is connected to a terminal of the liquid crystal capacitor Clc. Another terminal of the liquid crystal capacitor Clc of the second pixel PX(i+1, j) is connected to the output terminal of the second switching element Qbj of the first pixel PX(i, j).

The third pixel PX(i, j+1) that is adjacent to the first pixel PX(i, j) in a pixel row direction includes the first gate line Gni among the pair of gate lines Gn and Gni+1, the third data line Dj+1 and power lines Chigh and Clow, the fourth switching element Qaj+1 and the liquid crystal capacitor Clc connected thereto. The fourth switching element Qaj+1 is a three terminal element such as a thin film transistor and the like, the control terminal of the fourth switching element Qaj+1 is connected to the first gate line Gni, the input terminal is connected to the third data line Dj+1, and the output terminal is connected to the liquid crystal capacitor Clc. Another terminal of the liquid crystal capacitor Clc of the third pixel PX(i, j+1) is connected to the output terminal of the second switching element Qbj of the first pixel PX(i, j).

The fourth pixel PX(i+1, j+1) that is adjacent to the second pixel PX(i+1, j) in a pixel row direction includes the second gate line Gni+1 among the pair of gate lines Gni and Gni+1, the fourth data line Dj+1' and power lines Chigh and Clow, the sixth switching element Qcj+1 and the liquid crystal capacitor Clc connected thereto. The control terminal of the fifth switching element Qcj+1 is connected to the second gate line Gni+1, the input terminal is connected to the fourth data line Dj+1', and the output terminal is connected to the liquid crystal capacitor Clc. Another terminal of the liquid crystal capacitor Clc of the fourth pixel PX(i+1, j+1) is connected to the output terminal of the second switching element Qbj of the first pixel PX(i, j).

The fifth pixel PX(i, j+2) that is adjacent to the third pixel PX(i, j+1) in a pixel row direction includes the first gate line Gni, the fifth data line Dj+2, power lines Chigh and Clow, the sixth switching element Qaj+2, the seventh switching element Qbj+2 and the liquid crystal capacitor Clc connected thereto. The sixth switching element Qaj+2 and the seventh switching element Qbj+2 are three terminal elements such as a thin film transistor and the like, the control terminal of the sixth switching element Qaj+2 is connected to the first gate line Gni, the input terminal is connected to the fifth data line Dj+2, and the output terminal is connected to the liquid crystal capacitor Clc. The control terminal of the seventh switching element Qbj+2 is connected to the first gate line Gni, the input terminal is connected to the second power line Clow among the pair of power lines Chigh and Clow, and the output terminal is connected to the liquid crystal capacitor Clc.

The sixth pixel PX(i+2, j+2) that is adjacent to the fifth pixel PX(i, j+2) in a pixel column direction includes the second gate line Gni+1 among the pair of gate lines Gni and Gni+1, the sixth data line Dj+2', the power lines Chigh and Clow, the eighth switching element Qcj+2 and the liquid crystal capacitor Clc connected thereto. The eighth switching element Qcj+2 is a three terminal element such as a thin film transistor and the like, the control terminal of the eighth switching element Qcj+2 is connected to the second gate line Gni+1 among the pair of gate lines Gni and Gni+1, the input terminal is connected to the sixth data line Dj+2', and the output terminal is connected to a terminal of the liquid crystal capacitor Clc.

The first power lines Chigh among a plurality of pairs of power lines Chigh and Clow are connected to each other and applied with the same first voltage, and second power lines Clow among the plural pairs of power lines Chigh and Clow are connected to each other and applied with the same second voltage. With respect to the reference voltage Vref, the polarities of the first voltage and the second voltage that are applied to the first power line Chigh and the second power line Clow, respectively, are different from each other. For example, in the case of when the reference voltage Vref is 7.5 V, the first voltage may be about 15 V or more, the second voltage may be about 0 V or less, and vice versa.

An example of the driving method of the liquid crystal display according to the present exemplary embodiment will now be described in detail. If the gate-on voltage is applied to the gate line Gn, the first data voltage is applied to the first pixel PX(i, j) through the turned-on first switching element Qaj, the first voltage is applied to the first pixel PX(i, j), the second pixel PX(i+1, j), the third pixel PX(i, j+1) and the fourth pixel PX(i+1, j+1) through the turned-on second switching element Qbj, and the second data voltage is applied to the second pixel PX(i+1, j) through the turned-on third switching element Qcj. In addition, the third data voltage is applied through the turned-on fourth switching element Qaj+1 to the third pixel PX(i, j+1), and the fourth data voltage is applied through the turned-on fifth switching element Qcj+1 to the fourth pixel PX(i+1, j+1). In addition, the fifth data voltage is applied to the fifth pixel PX(i, j+2) through the turned-on sixth switching element Qaj+2, the second voltage is applied to the fifth pixel PX(i, j+2) and the sixth pixel PX(i+1, j+2) through the turned-on seventh switching element Qbj+2, and the sixth data voltage is applied to the sixth pixel PX(i+1, j+2) through the turned-on eighth switching element Qcj+2.

That is, the first data voltage that flows from the first data line Dj through the first switching element Qaj is applied to the first pixel electrode PEa of the first pixel PX(i, j), and the first voltage that flows through the second switching element Qbj from the first power line Chigh is applied to the second pixel electrode PEb of the first pixel PX(i, j). A difference in voltage between the first pixel electrode PEa and the second pixel electrode PEb to which the first data voltage and the first voltage are applied becomes a charge voltage of the liquid crystal capacitor Clc of the first pixel PX(i, j). At this time, a difference between the first data voltage and the first voltage that are applied to the first pixel electrode PEa of the first pixel PX(i, j) and the second pixel electrode PEb of the first pixel PX(i, j), respectively, is a voltage that corresponds to the luminance that is displayed by the first pixel PX(i, j), and the polarities thereof are opposites with respect to the reference voltage Vref.

In addition, the first voltage that flows through the second switching element Qbj from the first power line Chigh is applied to the first pixel electrode PEa of the second pixel PX(i, j+1), and the second data voltage that flows through the third switching element Qci from the second data line Dj' is applied to the second pixel electrode PEb of the second pixel PX(i, j+1). At this time, a difference between the first voltage and the second data voltage that are applied to the first pixel electrode PEa of the second pixel PX(i, j+1) and the second pixel electrode PEb of the second pixel PX(i, j+1), respectively, is a voltage that corresponds to the luminance that is displayed by the second pixel PX (i, j+1), and the polarities thereof are opposites with respect to the reference voltage Vref. Therefore, the polarities of the first data voltage and the second data voltage may be the same as each other with respect to the reference voltage Vref.

In addition, the third data voltage that flows through the fourth switching element Qaj+1 from the third data line Dj+1 is applied to the first pixel electrode PEa of the third pixel PX(i+1, j), and the first voltage that flows through the second switching element Qbj from the first power line Chigh is applied to the second pixel electrode PEb of the third pixel PX(i+1, j). A difference in voltage between the first pixel electrode PEa and the second pixel electrode PEb to which the third data voltage and the first voltage are applied becomes a charge voltage of the liquid crystal capacitor Clc of the third pixel PX(i+1, j). At this time, the voltage difference between the third data voltage and the first voltage that are applied to the first pixel electrode PEa of the third pixel PX(i+1, j) and the second pixel electrode PEb of the third pixel PX(i+1, j), respectively, is a voltage that corresponds to the luminance that is displayed by the third pixel PX(i+1, j), and the polarities thereof are opposites with respect to the reference voltage Vref.

In addition, the first voltage that flows through the second switching element Qbj from the first power line Chigh is applied to the first pixel electrode PEa of the fourth pixel PX(i+1, j+1), and the fourth data voltage that flows through the fifth switching element Qcj+1 from the fourth data line Dj+1' is applied to the second pixel electrode PEb of the fourth pixel PX(i+1, j+1). A difference in voltage between the first pixel electrode PEa and the second pixel electrode PEb to which the first voltage and the fourth data voltage are applied becomes a charge voltage of the liquid crystal capacitor Clc of the fourth pixel PX(i+1, j+1). At this time, the voltage difference between the first voltage and the fourth data voltage that are applied to the first pixel electrode PEa and the second pixel electrode PEb of the fourth pixel PX(i+1, j+1) is a voltage that corresponds to the luminance that is displayed by the fourth pixel PX(i+1, j+1), and the polarities thereof are opposites with respect to the reference voltage Vref.

In addition, the fifth data voltage that flows through the sixth switching element Qaj+2 from the fifth data line Dj+2 is applied to the first pixel electrode PEa of the fifth pixel PX(i, j+2), and the second voltage that flows through the seventh switching element Qbj+2 from the second power line Clow is applied to the second pixel electrode PEb of the fifth pixel PX(i, j+2). A difference in voltage between the first pixel electrode PEa and the second pixel electrode PEb to which the fifth data voltage and the second voltage are applied becomes a charge voltage of the liquid crystal capacitor Clc of the fifth pixel PX(i, j+2). At this time, the difference in voltage between the fifth data voltage and the second voltage that are applied to the first pixel electrode PEa and the second pixel electrode PEb of the fifth pixel PX(i, j+2) is a voltage that corresponds to the luminance that is displayed by the fifth pixel PX(i, j+2), and the polarities thereof are opposites with respect to the reference voltage Vref.

In addition, the second voltage that flows through the seventh switching element Qbj+2 from the second power line Clow is applied to the first pixel electrode PEa of the sixth pixel PX(i+1, j+2), and the sixth data voltage that flows through the eighth switching element Qcj+2 from the sixth data line Dj+2' is applied to the second pixel electrode PEb of the sixth pixel PX(i+1, j+2). A difference in voltage between the first pixel electrode PEa and the second pixel electrode PEb to which the second voltage and the sixth data voltage are respectively applied becomes a charge voltage of the liquid crystal capacitor Clc of the sixth pixel PX(i+1, j+2). At this time, the difference in voltage between the second voltage and the sixth data voltage that are applied to the first pixel electrode PEa and the second pixel electrode PEb of the sixth pixel PX(i+1, j+2) is a voltage that corresponds to the luminance that is displayed by the sixth pixel PX(i+1, j+2), and the polarities of the second voltage and the sixth data voltage are opposites with respect to the reference voltage Vref.

The first pixel PX(i, j), the third pixel PX(i, j+1) and the fifth pixel PX(i, j+2) of the liquid crystal display according to the present exemplary embodiment may display any one of red, green and blue colors, and may display any one of other three primary colors instead of the three primary colors of red, green and blue. In addition, the second pixel PX(i+1, j), the fourth pixel PX(i+1, j+1) and the sixth pixel PX(i+1, j+2) may display any one of red, green and blue colors, and may display any one of other three primary colors instead of the three primary colors of red, green and blue.

The liquid crystal display according to the present exemplary embodiment receives a voltage that corresponds to the charge voltage of the liquid crystal capacitor Clc by using five switching elements Qaj, Qbj, Qcj, Qaj+1, and Qcj+1 by four pixels PX(i, j), PX(i+1, j), PX(i, j+1), and PX(i+1, j+1) that are adjacent to each other. Particularly, since the first voltage is applied through the second switching element Qbj that is disposed in the first pixel PX(i, j) to four pixels PX(i, j), PX(i+1, j), PX(i, j+1), and PX(i+1, j+1), the number of switching elements is lowered, thereby increasing an aperture ratio of the liquid crystal display.

In addition, like the above exemplary embodiments, the power lines Chigh and Clow of the liquid crystal display according to the present exemplary embodiment each include a first portion (x) that is parallel to the gate lines Gni and Gni+1 and a second portion (y) that is parallel to the data lines (Dj and Dj', Dj+1 and Dj+1', Dj+2, Dj+2'). The first portion (x) that is parallel to the gate lines Gni and Gni+1 may prevent light leakage between two pixels that are adjacent in a column direction, and the second portion (y) that is parallel to the data lines (Dj and Dj', Dj+1 and Dj+1', Dj+2, Dj+2') may prevent light leakage between two pixels that are disposed adjacent in a row direction between the pixel electrode and the data line and prevent coupling between the pixel electrode and the data line.

In addition, like the above exemplary embodiments, two pixels, which are adjacent to each other in a pixel column direction, of the liquid crystal display according to the present exemplary embodiment are connected to the first gate line Gni and the second gate line Gni+1 that are branched lines of the same gate line Gn, respectively, and the gate on/off voltages are applied through one gate line Gn thereto. Therefore, a driving speed may become more rapid.

In addition, since at least one of two pixel electrodes PEa and PEb of two pixels that are adjacent in a column direction is connected to not the data line but any one of the first power line Chigh and the second power line Clow, the number of data lines is lowered, so that a cost of the driving unit of the liquid crystal display can be lowered.

Many characteristics of the liquid crystal display according to the above exemplary embodiments may be applied to the liquid crystal display according to the present exemplary embodiment.

The arrangement and driving method of the signal lines and the pixels of the liquid crystal display according to the present exemplary embodiment may be applied to all pixel structures that include the first pixel electrode and the second pixel electrode, which at least portions thereof, are formed on the same layer and alternately disposed.

While this invention has been described in connection with what is presently considered to be practical exemplary embodiments, it is to be understood that the invention is not limited to the disclosed embodiments, but, on the contrary, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A liquid crystal display, comprising:
   a first substrate and a second substrate facing each other;
   a liquid crystal layer disposed between the first substrate and the second substrate and comprising a liquid crystal molecule;
   a first gate line and a second gate line disposed on the first substrate;
   a first data line and a second data line disposed on the first substrate;
   a first power line disposed on the first substrate transmitting a first voltage having a constant value;
   a first switching element connected to the first gate line and the first data line;
   a second switching element connected to the first gate line and the first power line;
   a third switching element connected to the second gate line and the second data line;
   a first pixel electrode connected to the first switching element;
   a second pixel electrode connected to the second switching element;
   a third pixel electrode connected to the second switching element; and
   a fourth pixel electrode connected to the third switching element,
   wherein the first pixel electrode and the second pixel electrode are disposed in a first pixel, and the third pixel electrode and the fourth pixel electrode are disposed in a second pixel adjacent to the first pixel.

2. The liquid crystal display of claim 1, wherein:
the first gate line and the second gate line are branched lines of a gate line, and a gate-on voltage through the gate line is simultaneously applied to the first gate line and the second gate line.

3. The liquid crystal display of claim 2, wherein:
the first pixel electrode and the second pixel electrode each comprises a plurality of branched electrodes, and the branched electrodes of the first pixel electrode and the branched electrodes of the second pixel electrode are alternately disposed.

4. The liquid crystal display of claim 3, wherein:
the third pixel electrode and the fourth pixel electrode each comprises a plurality of branched electrodes, and the branched electrodes of the third pixel electrode and the branched electrodes of the fourth pixel electrode are alternately disposed.

5. The liquid crystal display of claim 4, wherein:
when a gate-on voltage is applied to the first gate line and the second gate line,
a first data voltage is applied to the first pixel electrode through the first data line, and the first voltage is applied to the second pixel electrode through the first power line,
the first voltage is applied to the third pixel electrode through the first power line, and a second data voltage is applied to the fourth pixel electrode through the second data line,
polarities of the first data voltage and the first voltage are different from each other, and
polarities of the first data voltage and the second data voltage are the same as each other.

6. The liquid crystal display of claim 1, wherein:
the first pixel electrode and the second pixel electrode each comprises a plurality of branched electrodes, and the branched electrodes of the first pixel electrode and the branched electrodes of the second pixel electrode are alternately disposed.

7. The liquid crystal display of claim 6, wherein:
the third pixel electrode and the fourth pixel electrode each comprises a plurality of branched electrodes, and the branched electrodes of the third pixel electrode and the branched electrodes of the fourth pixel electrode are alternately disposed.

8. The liquid crystal display of claim 1, wherein:
the first power line and a second power line each comprise a portion adjacent to the first gate line and another portion adjacent to the second gate line, and
the portion adjacent to the second gate line forms a storage capacitor in conjunction with the third pixel electrode.

9. The liquid crystal display of claim 1, wherein:
the first power line comprises a first portion parallel to the first gate line and the second gate line, and a second portion parallel to the first data line and the second data line, and the first portion and the second portion are connected to each other.

10. The liquid crystal display of claim 9, wherein:
the second portion of the first power line is disposed between the second pixel electrode and the second data line and between the third pixel electrode and the first data line.

11. The liquid crystal display of claim 1, further comprising:
a third data line and a fourth data line disposed on the first substrate;
a second power line disposed on the first substrate;
a fourth switching element connected to the first gate line and the third data line;
a fifth switching element connected to the first gate line and the second power line;
a sixth switching element connected to the second gate line and the fourth data line;
a fifth pixel electrode connected to the fourth switching element;
a sixth pixel electrode connected to the fifth switching element;
a seventh pixel electrode connected to the fifth switching element; and
an eighth pixel electrode connected to the sixth switching element.

12. The liquid crystal display of claim 11, wherein:
a polarity of the first voltage that is applied to the first power line is different from a polarity of a second voltage that is applied to the second power line.

13. The liquid crystal display of claim 12, wherein:
the first gate line and the second gate line are branched lines of a gate line, and a gate-on voltage through the gate line is simultaneously applied to the first gate line and the second gate line.

14. The liquid crystal display of claim 11, wherein:
the fifth pixel electrode and the sixth pixel electrode each comprises a plurality of branched electrodes, and the branched electrodes of the fifth pixel electrode and the branched electrodes of the sixth pixel electrode are alternately disposed.

15. The liquid crystal display of claim 14, wherein:
the seventh pixel electrode and the eighth pixel electrode each comprises a plurality of branched electrodes, and the branched electrodes of the seventh pixel electrode and the branched electrodes of the eighth pixel electrode are alternately disposed.

16. The liquid crystal display of claim 11, wherein:
the first gate line and the second gate line are branched lines of a gate line, and a gate-on voltage through the gate line is simultaneously applied to the first gate line and the second gate line.

17. The liquid crystal display of claim 16, wherein:
the fifth pixel electrode and the sixth pixel electrode each comprises a plurality of branched electrodes, and the branched electrodes of the fifth pixel electrode and the branched electrodes of the sixth pixel electrode are alternately disposed.

18. The liquid crystal display of claim 17, wherein:
the seventh pixel electrode and the eighth pixel electrode each comprises a plurality of branched electrodes, and the branched electrodes of the seventh pixel electrode and the branched electrodes of the eighth pixel electrode are alternately disposed.

19. The liquid crystal display of claim 11, wherein:
when a gate-on voltage is applied to the first gate line and the second gate line,
a third data voltage is applied to the fifth pixel electrode through the third data line, and a second voltage is applied to the sixth pixel electrode through the second power line,
the second voltage is applied to the seventh pixel electrode through the second power line, and a fourth data voltage is applied to the eighth pixel electrode through the fourth data line,
polarities of the third data voltage and the second voltage are different from each other, and
polarities of the third data voltage and the fourth data voltage are the same as each other.

20. The liquid crystal display of claim 11, further comprising:
a third power line disposed between the second data line and the third data line,
wherein the third power line is connected to any one of the first power line and the second power line.

21. The liquid crystal display of claim 20, wherein:
the third power line is disposed on a layer different from the first power line and the second power line, and
the third power line is connected to any one of the first power line and the second power line through a connecting member covering a contact hole exposing a portion of the third power line and a contact hole exposing a portion of any one of the first power line and the second power line.

22. The liquid crystal display of claim 20, wherein:
the first power line and the second power line are parallel to the first gate line and the second gate line, and
the third power line is parallel to the second data line and the third data line.

23. The liquid crystal display of claim 20, wherein:
the first power line and the second power line are formed on the same layer as the first gate line and the second gate line, and
the third power line is formed on the same layer as the second data line and the third data line.

24. The liquid crystal display of claim 20, wherein:
the third power line is disposed every at least six pixel lines.

25. The liquid crystal display of claim 20, further comprising:
a fourth power line disposed on the substrate,
wherein another of the first power line and the second power line not connected to the third power line is connected to the fourth power line.

26. The liquid crystal display of claim 25, wherein:
the fourth power line is disposed on a layer different from the first power line and the second power line, and
the fourth power line is connected to the other of the first power line and the second power line through a connecting member covering a contact hole exposing a portion of the fourth power line and a contact hole exposing a portion of the other of the first power line and the second power line.

27. The liquid crystal display of claim 25, wherein:
the first power line and the second power line are parallel to the first gate line and the second gate line, and
the third power line and the fourth power line are parallel to the second data line and the third data line.

28. The liquid crystal display of claim 25, wherein:
the first power line and the second power line are formed on the same layer as the first gate line and the second gate line, and
the third power line and the fourth power line are formed on the same layer as the second data line and the third data line.

29. The liquid crystal display of claim 25, wherein:
the fourth power line is disposed every at least six pixel lines.

30. The liquid crystal display of claim 25, wherein:
the third power line and the fourth power line are alternately arranged every at least three pixel lines.

31. The liquid crystal display of claim 11, wherein:
the first power line and the second power line each comprises a portion adjacent to the first gate line and a portion adjacent to the second gate line, and the portion adjacent to the second gate line forms a storage capacitor in conjunction with the seventh pixel electrode.

32. The liquid crystal display of claim 11, wherein:
the second power line comprises a first portion parallel to the first gate line and the second gate line, and a second portion parallel to the third data line and the fourth data line, and the first portion and the second portion are connected to each other.

33. The liquid crystal display of claim 32, wherein:
the second portion of the second power line is disposed between the sixth pixel electrode and the fourth data line and between the seventh pixel electrode and the third data line.

34. The liquid crystal display of claim 1, further comprising:
a third data line and a fourth data line disposed on the first substrate;
a fourth switching element connected to the first gate line and the third data line;
a fifth switching element connected to the second gate line and the fourth data line;
a fifth pixel electrode connected to the fourth switching element;
a sixth pixel electrode connected to the second switching element;
a seventh pixel electrode connected to the second switching element; and
an eighth pixel electrode connected to the fifth switching element.

35. The liquid crystal display of claim 34, wherein:
the first gate line and the second gate line are branched lines of a gate line, and a gate-on voltage through the gate line is simultaneously applied to the first gate line and the second gate line.

36. The liquid crystal display of claim 35, wherein:
the fifth pixel electrode and the sixth pixel electrode each comprises a plurality of branched electrodes, and the branched electrodes of the fifth pixel electrode and the branched electrodes of the sixth pixel electrode are alternately disposed.

37. The liquid crystal display of claim 36, wherein:
the seventh pixel electrode and the eighth pixel electrode each comprises a plurality of branched electrodes, and the branched electrodes of the seventh pixel electrode and the branched electrodes of the eighth pixel electrode are alternately disposed.

38. The liquid crystal display of claim 35, wherein:
when a gate-on voltage is applied to the first gate line and the second gate line,
a third data voltage is applied to the fifth pixel electrode through the third data line, and the first voltage is applied to the sixth pixel electrode through the first power line,
the first voltage is applied to the seventh pixel electrode through the first power line, and a fourth data voltage is applied to the eighth pixel electrode through the fourth data line,
polarities of the third data voltage and the first voltage are different from each other, and
polarities of the third data voltage and the fourth data voltage are the same as each other.

39. The liquid crystal display of claim 34, wherein:
the fifth pixel electrode and the sixth pixel electrode each comprises a plurality of branched electrodes, and the branched electrodes of the fifth pixel electrode and the branched electrodes of the sixth pixel electrode are alternately disposed.

40. The liquid crystal display of claim 39, wherein:
the seventh pixel electrode and the eighth pixel electrode each comprises a plurality of branched electrodes, and the branched electrodes of the seventh pixel electrode and the branched electrodes of the eighth pixel electrode are alternately disposed.

41. The liquid crystal display of claim 34, further comprising:
a fifth data line and a sixth data line disposed on the first substrate;
a second power line disposed on the first substrate;
a sixth switching element connected to the first gate line and the fifth data line;
a seventh switching element connected to the first gate line and the second power line;
an eighth switching element connected to the second gate line and the sixth data line;
a ninth pixel electrode connected to the sixth switching element;
a tenth pixel electrode connected to the seventh switching element;
an eleventh pixel electrode connected to the seventh switching element; and
a twelfth pixel electrode connected to the eighth switching element.

42. The liquid crystal display of claim 41, wherein:
the first gate line and the second gate line are branched lines of a gate line, and a gate-on voltage through the gate line is simultaneously applied to the first gate line and the second gate line.

43. The liquid crystal display of claim 42, wherein:
the ninth pixel electrode and the tenth pixel electrode each comprises a plurality of branched electrodes, and the branched electrodes of the ninth pixel electrode and the branched electrodes of the tenth pixel electrode are alternately disposed.

44. The liquid crystal display of claim 43, wherein:
the eleventh pixel electrode and the twelfth pixel electrode each comprises a plurality of branched electrodes, and the branched electrodes of the eleventh pixel electrode and the branched electrode of the twelfth pixel electrodes are alternately disposed.

45. The liquid crystal display of claim 42, wherein:
when a gate-on voltage is applied to the first gate line and the second gate line,
a fifth data voltage is applied to the ninth pixel electrode through the fifth data line, and a second voltage is applied to the tenth pixel electrode through the second power line,
the second voltage is applied to the eleventh pixel electrode through the second power line, and a sixth data voltage is applied to the twelfth pixel electrode through the sixth data line,
polarities of the fifth data voltage and the second voltage are different from each other, and
polarities of the fifth data voltage and the sixth data voltage are the same as each other.

46. The liquid crystal display of claim 41, wherein:
the ninth pixel electrode and the tenth pixel electrode each comprises a plurality of branched electrodes, and the branched electrodes of the ninth pixel electrode and the branched electrodes of the tenth pixel electrode are alternately disposed.

47. The liquid crystal display of claim 46, wherein:
the eleventh pixel electrode and the twelfth pixel electrode each comprises a plurality of branched electrodes, and the branched electrodes of the eleventh pixel electrode and the branched electrodes of the twelfth pixel electrode are alternately disposed.

48. The liquid crystal display of claim 41, wherein:
the second power line comprises a first portion parallel to the first gate line and the second gate line, and a second portion parallel to the fifth data line and the sixth data line, and the first portion and the second portion are connected to each other.

49. The liquid crystal display of claim 48, wherein:
the second portion of the second power line is disposed between the tenth pixel electrode and the sixth data line and between the eleventh pixel electrode and the fifth data line.

50. The liquid crystal display of claim 1, wherein the second pixel electrode and the third pixel electrode are disposed in different pixels.

51. The liquid crystal display of claim 48, wherein the first data line and the second data line are configured to receive data signals according to an image to be displayed, and the first power line is configured to receive a power having a magnitude irrespective of the image to be displayed.

* * * * *